United States Patent
Zhao et al.

(10) Patent No.: US 11,176,404 B2
(45) Date of Patent: Nov. 16, 2021

(54) METHOD AND APPARATUS FOR DETECTING OBJECT IN IMAGE, AND STORAGE MEDIUM THEREOF

(71) Applicant: TENCENT TECHNOLOGY (SHENZHEN) COMPANY LIMITED, Shenzhen (CN)

(72) Inventors: Shijie Zhao, Shenzhen (CN); Feng Li, Shenzhen (CN); Xiaoxiang Zuo, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 17/008,189

(22) Filed: Aug. 31, 2020

(65) Prior Publication Data

US 2020/0394433 A1     Dec. 17, 2020

Related U.S. Application Data

(63) Continuation of application No. PCT/CN2019/090406, filed on Jun. 6, 2019.

(30) Foreign Application Priority Data

Jul. 11, 2018 (CN) .......................... 201810754633.X

(51) Int. Cl.
  *G06K 9/46* (2006.01)
  *G06T 7/73* (2017.01)
  *G06K 9/62* (2006.01)
  *G06N 3/02* (2006.01)

(52) U.S. Cl.
  CPC ............. *G06K 9/46* (2013.01); *G06K 9/6232* (2013.01); *G06K 9/6267* (2013.01); *G06N 3/02* (2013.01);
  (Continued)

(58) Field of Classification Search
  CPC ...... G06K 9/46; G06K 9/6232; G06K 9/6267; G06K 9/6271; G06K 9/4628;
  (Continued)

(56) References Cited

U.S. PATENT DOCUMENTS 9,530,047 B1 * 12/2016 Tang .................... G06K 9/4652
10,346,726 B2 * 7/2019 Han ..................... G06K 9/4628
(Continued)

FOREIGN PATENT DOCUMENTS

CN        105981008 A        9/2016
CN        106845499 A  *     6/2017
(Continued)

OTHER PUBLICATIONS

Fusion that matters: convolutional fusion networks for visual recognition, Yu Liu et al., Springer, Jan. 19, 2018, pp. 1-28 (Year: 2018).*

(Continued)

*Primary Examiner* — Jayesh A Patel
(74) *Attorney, Agent, or Firm* — Crowell & Moring

(57) ABSTRACT

An embodiment of this application provides an image object detection method. The method may include obtaining a detection image, an n-level deep feature map framework, and an m-level non-deep feature map framework. The method may further include extracting deep feature from an (i−1)-level feature of the detection image using an i-level deep feature map framework, to obtain an i-level feature of the detection image. The method may further include extracting non-deep feature from a (j−1+n)-level feature of the detection image using a j-level non-deep feature map framework, to obtain a (j+n)-level feature of the detection image. The method may further include performing information regression operation on an a-level feature to an (m+n)-level feature of the detection image, to obtain an (Continued)

object type information and an object position information of an object in the detection image. The a is an integer less than n and greater than or equal to 2.

20 Claims, 9 Drawing Sheets

(52) U.S. Cl.
CPC ...... *G06T 7/73* (2017.01); *G06T 2207/20084* (2013.01)
(58) Field of Classification Search
CPC .............. G06K 9/3233; G06T 7/73; G06T 2207/20084; G06T 7/246; G06T 2207/10004; G06N 3/02
See application file for complete search history.

(56) References Cited

U.S. PATENT DOCUMENTS

| | | | | |
|---|---|---|---|---|
| 10,558,885 B2* | 2/2020 | Kim | ...................... | G06N 3/0454 |
| 2015/0238148 A1* | 8/2015 | Georgescu | ........... | G06K 9/4628 |
| | | | | 600/408 |
| 2015/0347820 A1* | 12/2015 | Yin | ...................... | G06N 3/0454 |
| | | | | 382/118 |
| 2016/0117587 A1* | 4/2016 | Yan | .......................... | G06N 3/04 |
| | | | | 706/20 |
| 2018/0182068 A1* | 6/2018 | Kwan | .................. | G06K 9/4628 |
| 2019/0318806 A1* | 10/2019 | Wise | .................... | G06N 3/0481 |
| 2019/0325605 A1* | 10/2019 | Ye | ............................. | G06T 7/73 |
| 2021/0012508 A1* | 1/2021 | Porcel Magnusson | ... | G06T 7/11 |

FOREIGN PATENT DOCUMENTS

| | | | | |
|---|---|---|---|---|
| CN | 106845499 A | | 6/2017 | |
| CN | 108198192 A | | 6/2018 | |
| WO | WO-2018121013 A1 | * | 7/2018 | ......... G06K 9/00832 |

OTHER PUBLICATIONS

DopNet: A Deep Convolutional Neural Network to Recognize Armed and Unarmed Human Targets, Qingchao Chen et al, Jun. 1, 2019, IEEE, pp. 4160-4172 (Year: 2019).*
International Search Report issued in International Application No. PCT/CN2019/090406 dated Aug. 21, 2019.

* cited by examiner

METHOD AND APPARATUS FOR DETECTING OBJECT IN IMAGE, AND STORAGE MEDIUM THEREOF

RELATED APPLICATION

This application is a continuation application of PCT Patent Application No. PCT/CN2019/090406, filed on Jun. 6, 2019, which claims priority to Chinese patent application No. 201810754633.X, entitled "IMAGE OBJECT DETECTION METHOD AND APPARATUS, AND STORAGE MEDIUM" filed with the National Intellectual Property Administration, PRC on Jul. 11, 2018, wherein the entirety of each of the above-referenced applications is incorporated herein by reference in its entirety.

FIELD OF THE TECHNOLOGY

This application relates to the field of image processing, and in particular, to an image object detection method and apparatus, a storage medium, and an electronic device.

BACKGROUND OF THE DISCLOSURE

With the development of technologies, the object recognition technology in images has become an increasingly important issue of computer vision. That is, to-be-recognized objects need to be marked in a given picture. For example, objects, such as a person, a vehicle, and a house, are marked in a picture.

Recently, with the rise of deep learning, a great breakthrough is achieved in the application of deep learning in the field of image object detection, and a series of image object learning methods based on a deep learning algorithm, such as a faster-regions with convolutional neural networks features (Faster-RCNN) algorithm or a you only look once (YOLO) algorithm, are put forward.

However, a technical focus of existing image object detection algorithms is accuracy of a detection result, and running speeds of the existing image object detection algorithms cannot satisfy requirements of actual scenarios. Because model sizes of some relatively efficient image object detection systems all exceed 100 Mb, the existing image object detection systems have relatively low running speeds and cannot be implemented on a mobile terminal with a relatively small resource configuration.

SUMMARY

Embodiments of this application provide an image object detection method and apparatus of which a running speed is relatively high and a configuration resource requirement is relatively low, a storage medium, and an electronic device, to resolve the technical problem that the existing image object detection method and apparatus have a relatively low running speed and cannot be implemented on a mobile terminal with a relatively small resource configuration.

An embodiment of this application provides a method for detecting an object in an image. The method may include obtaining a detection image, an n-level deep feature map framework, and an m-level non-deep feature map framework. The n is an integer greater than or equal to 2. The m is an integer greater than or equal to 1. The n-level deep feature map framework and the m-level non-deep feature map framework may include a feature size and a feature dimension. The method may further include extracting, based on a deep feature extraction model, deep feature from an (i−1)-level feature of the detection image using an i-level deep feature map framework, to obtain an i-level feature of the detection image. The i is a positive integer less than or equal to n. The method may further include extracting, based on a non-deep feature extraction model, non-deep feature from a (j−1+n)-level feature of the detection image using a j-level non-deep feature map framework, to obtain a (j+n)-level feature of the detection image. The j is a positive integer less than or equal to m. The method may further include performing, based on a feature prediction model, an information regression operation on an a-level feature to an (m+n)-level feature of the detection image, to obtain an object type information and an object position information of an object in the detection image. The a is an integer less than n and greater than or equal to 2.

An embodiment of this application further provides an apparatus for detecting an object in an image, including a memory operable to store program code and a processor operable to read the program code. The processor may be configured to obtain a detection image, an n-level deep feature map framework, and an m-level non-deep feature map framework. The n is an integer greater than or equal to 2. The m is an integer greater than or equal to 1. The n-level deep feature map framework and the m-level non-deep feature map framework may include a feature size and a feature dimension. The processor may be further configured to extract, based on a deep feature extraction model, deep feature from an (i−1)-level feature of the detection image using an i-level deep feature map framework, to obtain an i-level feature of the detection image. The i is a positive integer less than or equal to n. The processor may be further configured to extract, based on a non-deep feature extraction model, non-deep feature from a (j−1+n)-level feature of the detection image using a j-level non-deep feature map framework, to obtain a (j+n)-level feature of the detection image. The j is a positive integer less than or equal to m. The processor may be further configured to perform, based on a feature prediction model, an information regression operation on an a-level feature to an (m+n)-level feature of the detection image, to obtain an object type information and an object position information of an object in the detection image. The a is an integer less than n and greater than or equal to 2.

An embodiment of this application further provides a non-transitory machine-readable media, having processor executable instructions stored thereon for causing a processor to obtain a detection image, an n-level deep feature map framework, and an m-level non-deep feature map framework. The n is an integer greater than or equal to 2. The m is an integer greater than or equal to 1. The n-level deep feature map framework and the m-level non-deep feature map framework may include a feature size and a feature dimension. The instructions may cause the processor to extract, based on a deep feature extraction model, deep feature from an (i−1)-level feature of the detection image using an i-level deep feature map framework, to obtain an i-level feature of the detection image. The i is a positive integer less than or equal to n. The instructions may cause the processor to extract, based on a non-deep feature extraction model, non-deep feature from a (j−1+n)-level feature of the detection image using a j-level non-deep feature map framework, to obtain a (j+n)-level feature of the detection image. The j is a positive integer less than or equal to m. The instructions may cause the processor to perform, based on a feature prediction model, an information regression operation on an a-level feature to an (m+n)-level feature of the detection image, to obtain an object type information and an object position information of an object in the detection image. The a is an integer less than n and greater than or equal to 2.

DESCRIPTION OF EMBODIMENTS

Figure 1:
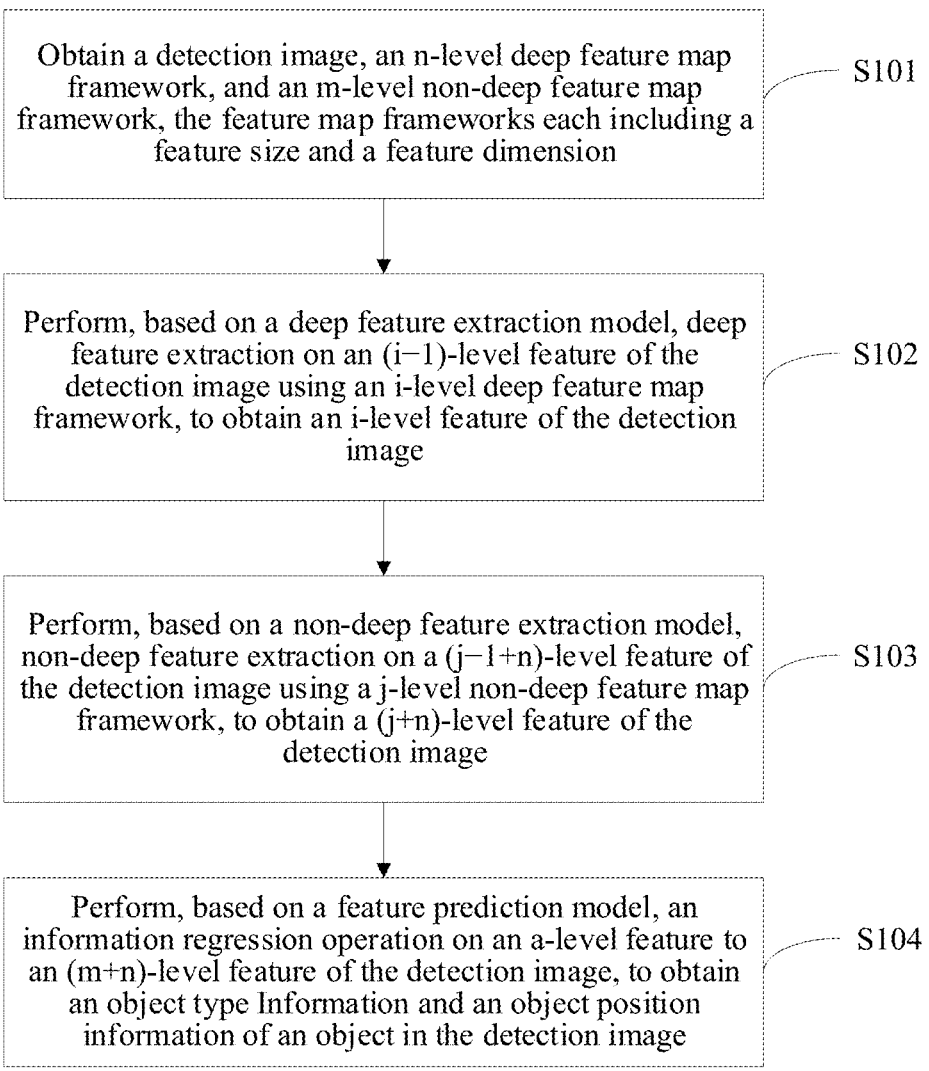
FIG. 1 is a flowchart of an image object detection method according to an embodiment of this application.

Referring to the drawings, same component symbols represent same components. A principle of this application is described using examples in which this application is implemented in a proper computing environment. The following descriptions are specific embodiments of this application based on the examples, and are not to be construed as a limitation to other specific embodiments of this application that are not described herein in detail.

In the following description, the specific embodiments of this application are described with reference to steps and symbols of operations that are performed by one or more computers, unless indicated otherwise. Therefore, the steps and operations may be learned from the description, where it is mentioned for a plurality of times that the steps and operations are performed by a computer, including that the steps and operations are manipulated by a computer processing unit of an electronic signal that represents data in a structured pattern. This manipulation transforms the data or maintains it at locations in the memory system of the computer, which reconfigures or otherwise alters the operation of the computer in a manner well understood by a person skilled in the art. The data structures where data is maintained are physical locations of the memory that have particular properties defined by the format of the data. However, the principle of the embodiments of this application is described using the foregoing words, but is not intended to be a limitation. A person skilled in the art may understand that the following various steps and operations may also be implemented in hardware.

The image object detection method and image object detection apparatus in the embodiments of this application may be set in any electronic device, to perform detection and recognition operations on objects, such as a person, a vehicle, and a house, in a picture or photo. The electronic device includes, but is not limited to, a wearable device, a head-mounted device, a healthcare platform, a personal computer, a server computer, a handheld or laptop device, a mobile device (for example, a mobile phone, a personal digital assistant (PDA), or a media player), a multiprocessor system, a consumer electronic device, a minicomputer, a mainframe computer, a distributed computing environment including any of the foregoing system or device, and the like. For example, the electronic device may be a mobile terminal on which an image object recognition application is installed, object features in an image may be quickly extracted by the mobile terminal, and a requirement for a configuration resource of the mobile terminal is relatively low.

FIG. 1 is a flowchart of an image object detection method according to an embodiment of this application. The image object detection method of this embodiment may be implemented using the foregoing electronic device, and the image object detection method of this embodiment includes the following steps:

Step S101: Obtain a detection image, an n-level deep feature map framework, and an m-level non-deep feature map framework, n being an integer greater than or equal to 2, m being an integer greater than or equal to 1, and the feature map frameworks each including a feature size and a feature dimension that are outputted.

Step S102: Perform, based on a deep feature extraction model, deep feature extraction on an (i−1)-level feature of the detection image using an i-level deep feature map framework, to obtain an i-level feature of the detection image, i being a positive integer less than or equal to n.

Step S103: Perform, based on a non-deep feature extraction model, non-deep feature extraction on a (j−1+n)-level feature of the detection image using a j-level non-deep feature map framework, to obtain a (j+n)-level feature of the detection image, j being a positive integer less than or equal to m.

Step S104: Perform, based on a feature prediction model, an information regression operation on an a-level feature to an (m+n)-level feature of the detection image, to obtain an object type information and an object position information of an object in the detection image, a being an integer less than n and greater than or equal to 2.

An image object detection process of the image object detection method of this embodiment is described in detail below. The image object detection apparatus in the following embodiment may be an electronic device capable of performing the image object detection method.

In step S101, the image object detection apparatus obtains a detection image on which object detection needs to be performed, and n levels deep feature map frameworks and m levels non-deep feature map frameworks that perform object detection on the detection image. In this embodiment, n is an integer greater than or equal to 2, and m is an integer greater than or equal to 1. That is, a feature extraction operation needs to be performed on the detection image for at least three times.

To perform precise and comprehensive object detection on the detection image, feature extraction operations at a plurality of levels, for example, m+n levels, need to be performed on the detection image. A feature size of a lower level is certainly smaller than a feature size of a higher level, so that a feature extraction operation on the lower level may be performed on a feature outputted by a feature extraction operation on the higher level. For a large-size feature extraction operation, because few higher-level feature extraction operations are performed before, a deep feature extraction model and a deep feature map framework need to be used for performing feature extraction. For a small-size feature extraction operation, because higher-level feature extraction operations have been performed for a plurality of times before, only a non-deep feature extraction model and a non-deep feature map framework need to be used to perform feature extraction.

Herein, the deep feature map framework is a recognition parameter used for performing feature recognition on the detection image or a lower-level feature corresponding to the detection image, and the deep feature map framework may include a feature size and a feature dimension that are outputted at each deep feature level. The non-deep feature map framework is a recognition parameter used for performing feature recognition on a lower-level feature corresponding to the detection image, and the non-deep feature map framework may include a feature size and a feature dimension that are outputted at each non-deep feature level.

In step S102, the image object detection apparatus performs, based on a preset deep feature extraction model, deep feature extraction on an (i−1)-level feature of the detection image using an i-level deep feature map framework obtained in step S101, to obtain an i-level feature of the detection image, i being a positive integer less than or equal to n.

That is, the image object detection apparatus performs deep feature extraction on pixels of the detection image based on the preset deep feature extraction model, to obtain a 1-level feature of the detection image corresponding to a 1-level deep feature map framework; then the image object detection apparatus performs deep feature extraction on the 1-level feature of the detection image, to obtain a 2-level feature of the detection image corresponding to a 2-level deep feature map framework . . . ; and eventually, the image object detection apparatus performs deep feature extraction on an (n−1)-level feature of the detection image, to obtain an n-level feature of the detection image corresponding to an n-level deep feature map framework. In this way, the 1-level feature to the n-level feature of the detection image are obtained.

In step S103, the image object detection apparatus performs, based on a preset non-deep feature extraction model, non-deep feature extraction on a (j−1+n)-level feature of the detection image using a j-level non-deep feature map framework obtained in step S101, to obtain a (j+n)-level feature of the detection image, j being a positive integer less than or equal to m.

That is, the image object detection apparatus performs non-deep feature extraction on the n-level feature of the detection image based on the preset non-deep feature extraction model, to obtain an (n+1)-level feature of the detection image corresponding to a 1-level non-deep feature map framework; then the image object detection apparatus performs non-deep feature extraction on the (n+1)-level feature of the detection image, to obtain an (n+2)-level feature of the detection image corresponding to a 2-level non-deep feature map framework . . . ; and eventually, the image object detection apparatus performs deep feature extraction on an (n+m−1)-level feature of the detection image, to obtain an (m+n)-level feature of the detection image corresponding to an (m+n)-level deep feature map framework. In this way, the (n+1)-level feature to the (m+n)-level feature of the detection image are obtained.

In step S104, the image object detection apparatus performs, based on a preset feature prediction model, an information regression operation on an a-level feature to the (m+n)-level feature of the detection image that are obtained in step S102 and step S103, to obtain an object type information and an object position information of the object in the detection image, where a is an integer that is less than n and greater than or equal to 2.

Specifically, because feature sizes of the 1-level feature to an (a−1)-level feature of the detection image are relatively large, it is meaningless to perform feature classification and recognition. Therefore the image object detection apparatus directly discards the 1-level feature to the (a−1)-level feature of the detection image. The image object detection apparatus performs feature classification and recognition on the a-level feature to the (m+n)-level feature of the detection image, to obtain object type information (for example, a person, a vehicle, and a house) and object position information (for example, center coordinates of an object, and the length and the width of an object box) of the detection image corresponding to the features.

In this way, the image object detection process of the image object detection method of this embodiment is completed.

According to the image object detection method of this embodiment, extraction and feature recognition are performed, based on a deep feature extraction model and a non-deep feature extraction model, on a plurality of features of different sizes of the same detection image. The small-size features of the detection image may be directly extracted based on the large-size features of the detection image, so that an overall speed of feature extraction is relatively high, and a requirement for the configuration resource is relatively low.

Figure 2:
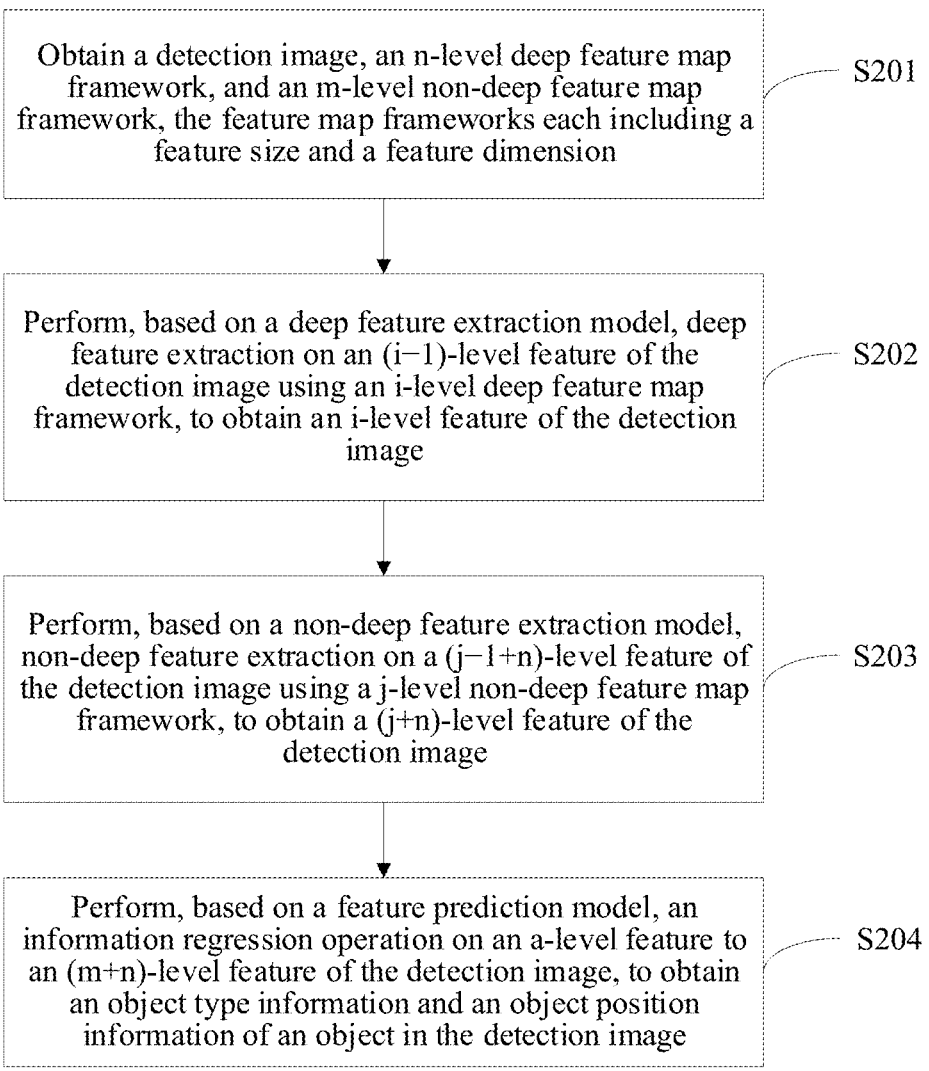
FIG. 2 is a flowchart of an image object detection method according to another embodiment of this application.

FIG. 2 is a flowchart of an image object detection method according to another embodiment of this application. The image object detection method of this embodiment may be implemented using the foregoing electronic device, and the image object detection method of this embodiment includes the following steps:

Step S201: Obtain a detection image, an n-level deep feature map framework, and an m-level non-deep feature map framework, n being an integer greater than or equal to 2, m being an integer greater than or equal to 1, and the feature map frameworks each including a feature size and a feature dimension that are outputted.

Step S202: Perform, based on a deep feature extraction model, deep feature extraction on an (i−1)-level feature of the detection image using an i-level deep feature map framework, to obtain an i-level feature of the detection image, i being a positive integer less than or equal to n.

Step S203: Perform, based on a non-deep feature extraction model, non-deep feature extraction on a (j−1+n)-level feature of the detection image using a j-level non-deep feature map framework, to obtain a (j+n)-level feature of the detection image, j being a positive integer less than or equal to m.

Step S204: Perform, based on a feature prediction model, an information regression operation on an a-level feature to an (m+n)-level feature of the detection image, to obtain an object type information and an object position information of an object in the detection image, a being an integer less than n and greater than or equal to 2.

An image object detection process of the image object detection method of this embodiment is described in detail below.

In step S201, an image object detection apparatus obtains a detection image on which object detection needs to be performed, and an n-level deep feature map framework and an m-level non-deep feature map framework that perform object detection on the detection image. In this embodiment, n is an integer greater than or equal to 2, and m is an integer greater than or equal to 1. That is, a feature extraction operation needs to be performed on the detection image for at least three times.

Herein, the deep feature map framework is a recognition parameter used for performing feature recognition on the detection image or a lower-level feature corresponding to the detection image, and the deep feature map framework may include a feature size and a feature dimension that are outputted at each deep feature level. The non-deep feature map framework is a recognition parameter used for performing feature recognition on a lower-level feature corresponding to the detection image, and the non-deep feature map framework may include a feature size and a feature dimension that are outputted at each non-deep feature level.

In step S202, the image object detection apparatus performs, based on a preset deep feature extraction model, deep feature extraction on an (i−1)-level feature of the detection image using an i-level deep feature map framework obtained in step S201, to obtain an i-level feature of the detection image, where i is a positive integer that is less than or equal to n.

In this embodiment, the deep feature extraction model includes a deep input convolution layer, a first deep nonlinear transformation convolution layer, a second deep nonlinear transformation convolution layer, and a deep output convolution layer.

Figure 3:
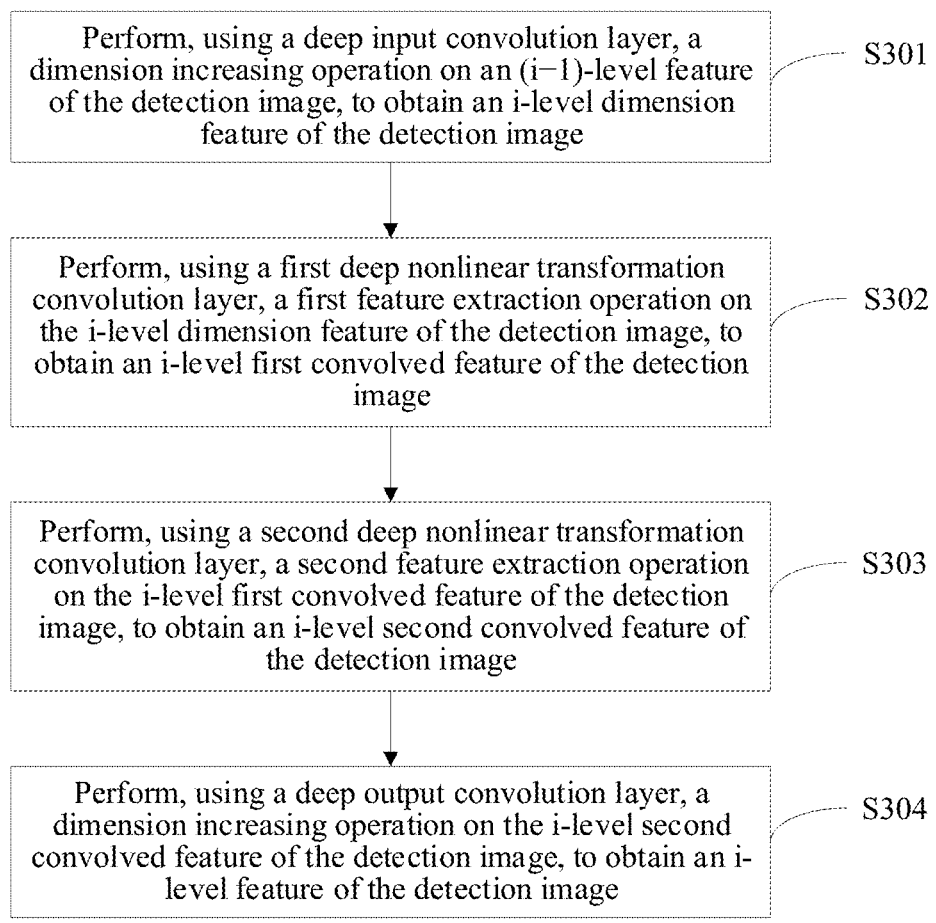
FIG. 3 is a flowchart of the image object detection method according to an embodiment of this application.

Specifically, FIG. 3 is a flowchart of step S202 of the image object detection method shown in FIG. 2 according to an embodiment of this application. Step S202 includes the following steps:

Step S301: The image object detection apparatus performs, using a deep input convolution layer of the deep feature extraction model, a dimension increasing operation on an (i−1)-level feature of the detection image, to obtain an i-level dimension feature of the detection image.

The deep input convolution layer is a standard convolution layer with a 1*1 convolution kernel size and with a nonlinear activation function, where a relatively large quantity of channels, such as 4 to 6, may be set for the deep input convolution layer. In this way, a dimension of an inputted feature may be increased while ensuring a feature size of the detection image, thereby resolving a problem of feature loss of the detection image.

The quantity of channels of the deep input convolution layer is used for representing a quantity of feature extraction patterns for performing feature extraction on low-level features of the detection image, and the convolution kernel size of the deep input convolution layer is used for adjusting complexity of a deep neural network model.

For example, the inputted (i−1)-level feature of the detection image is a 32*32*3 feature point matrix, where 3 is a quantity of input channels of the detection image, for example, a red pixel intensity value, a blue pixel intensity value, and a green pixel intensity value. If the convolution kernel size of the deep input convolution layer is set to 1*1, an outputted feature size of the deep input convolution layer is 32*32. That is, a feature map with a size of 32*32 may be obtained using a 1*1 convolution kernel to sequentially traverse a 32*32 feature point matrix, and if the quantity of channels of the deep input convolution layer is 6, an obtained output of the deep input convolution layer is a 32*32*18 i-level dimension feature. In this way, a dimension feature of the detection image with a higher dimension is obtained without changing the outputted feature size.

The deep input convolution layer then performs nonlinear processing on the outputted i-level dimension feature using a nonlinear activation function, for example, a rectified linear unit (ReLU) function, to ensure that the output of the deep input convolution layer is differentiable, thereby improving accuracy of subsequently outputted features.

Step S302: The image object detection apparatus performs, using a first deep nonlinear transformation convolution layer of the deep feature extraction model, a first feature extraction operation on the i-level dimension feature of the detection image obtained in step S301, to obtain an i-level first convolved feature of the detection image.

The first deep nonlinear transformation convolution layer is a depthwise separable convolution layer with a 3*3 convolution kernel size and with a nonlinear activation function, where the setting of a depthwise separable convolution layer may greatly reduce a computation amount of the first deep nonlinear transformation convolution layer, thereby further greatly reducing a size of the deep feature extraction model.

The depthwise separable convolution layer may implement spatial convolution while maintaining the channels separated. For example, if a standard convolution layer with a 3*3 convolution kernel size has 16 input channels and 32 output channels, 32 3*3 convolution kernels traverse each piece of data in the 16 channels, and 16*32*32*3=4608 parameters need to be set to perform convolution computation. For a depthwise separable convolution layer with a 3*3 convolution kernel size, one 3*3 convolution kernel is used to traverse data of the 16 channels to obtain 16 feature maps, and 32 1*1 convolution kernels are then used to traverse the 16 feature maps. In this way, only 16*3*3+16*32*1*1=656 parameters need to be set to complete the convolution computation.

In this step, the first deep nonlinear transformation convolution layer first performs the first feature extraction operation on the i-level dimension feature of the detection image, and the first deep nonlinear transformation convolution layer then performs nonlinear processing on the outputted i-level first convolved feature using a nonlinear activation function, for example, the ReLU function, to ensure that the output of the first deep nonlinear transformation convolution layer is differentiable, thereby improving accuracy of subsequently outputted features.

Step S303: The image object detection apparatus performs, using a second deep nonlinear transformation convolution layer of the deep feature extraction model, a second feature extraction operation on the i-level first convolved feature of the detection image obtained in step S302, to obtain an i-level second convolved feature of the detection image.

The second deep nonlinear transformation convolution layer is a depthwise separable atrous convolution layer with a 3*3 convolution kernel size and with a nonlinear activation function, where the setting of the depthwise separable atrous convolution layer may further increase a receptive field of each basic feature unit of the detection image while greatly reducing the computation amount of the second deep nonlinear transformation convolution layer, to further improve accuracy of the i-level second convolved feature outputted by the second deep nonlinear transformation convolution layer.

The atrous convolutions may set a parameter "dilation rate" in the convolution operation, and the dilation rate defines a spacing between pieces of data when the convolution layer processes data. For a standard convolution layer with a 5*5 convolution kernel size, 25 parameters need to be set. However, if an atrous convolution layer with a 3*3 convolution kernel size and with a dilation rate of 2 is set, only 9 parameters need to be set. That is, based on the 5*5 convolution kernel, one row of data is deleted every other row and one column of data is deleted every other column. Therefore, under the same computation condition, the atrous convolution layer may provide a larger receptive field without increasing the computation amount.

Herein, the atrous convolution layer is set in the second deep nonlinear transformation convolution layer, so that deep feature extraction may be performed again using relatively few resources on the basis that the first deep nonlinear transformation convolution layer has already performed preliminary deep feature extraction, and the problem that the receptive field in the first feature extraction operation is relatively small may be better fixed.

In this step, the second deep nonlinear transformation convolution layer first performs the second feature extraction operation on the i-level first convolved feature of the detection image, and the second deep nonlinear transformation convolution layer then performs nonlinear processing on the outputted i-level second convolved feature using a nonlinear activation function, for example, the ReLU function, to ensure that the output of the second deep nonlinear transformation convolution layer is differentiable, thereby improving accuracy of subsequently outputted features.

Step S304: The image object detection apparatus performs, using a deep output convolution layer of the deep feature extraction model, a dimension decreasing operation on the i-level second convolved feature of the detection image obtained in step S303, to obtain an i-level feature of the detection image.

The deep output convolution layer is a standard convolution layer with a 1*1 convolution kernel size and without an activation function. Herein, the deep output convolution layer may restore the dimension increased in step S301 to a dimension inputted into the deep input convolution layer; and no activation function is set in the deep output convolution layer, to avoid the activation function from causing loss of outputted features. The i-level feature of the detection image outputted by the deep output convolution layer is to conform to the i-level deep feature map framework.

In this way, a process of performing deep feature extraction on the (i−1)-level feature of the detection image using the i-level deep feature map framework, to obtain the i-level feature of the detection image, is completed. A 1-level feature to an n-level feature of the detection image may be obtained by repeating step S301 to step S304.

In step S203, the image object detection apparatus performs, based on a preset non-deep feature extraction model, non-deep feature extraction on a (j−1+n)-level feature of the detection image using a j-level non-deep feature map framework obtained in step S201, to obtain a (j+n)-level feature of the detection image, j being a positive integer less than or equal to m.

In this embodiment, the non-deep feature extraction model includes a non-deep input convolution layer, a non-deep nonlinear transformation convolution layer, and a non-deep output convolution layer.

Figure 4:
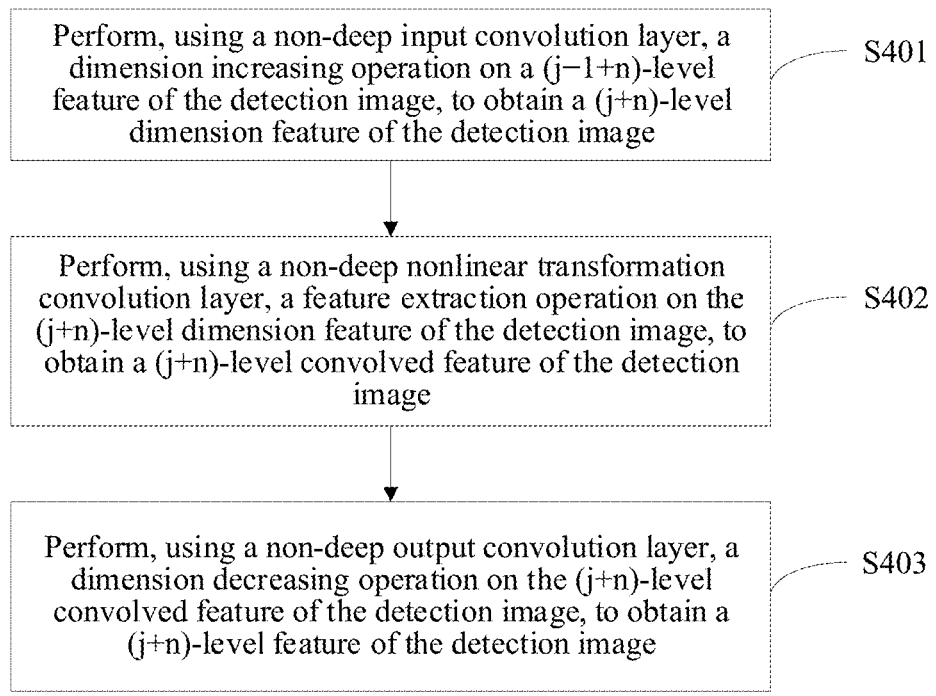
FIG. 4 is a flowchart of the image object detection method according to an embodiment of this application.

Specifically, FIG. 4 is a flowchart of step S203 of the image object detection method shown in FIG. 2 according to an embodiment of this application. Step S203 includes the following steps:

Step S401: The image object detection apparatus performs, using a non-deep input convolution layer of the non-deep feature extraction model, a dimension operation on a (j−1+n)-level feature of the detection image, to obtain a (j+n)-level dimension feature of the detection image.

The non-deep input convolution layer is a standard convolution layer with a 1*1 convolution kernel size and with a nonlinear activation function, where a relatively large quantity of channels, such as 4 to 6, may be set for the non-deep input convolution layer. In this way, a dimension of an inputted feature may be increased while ensuring a feature size of the detection image, thereby resolving a problem of feature loss of the detection image.

The non-deep input convolution layer then performs nonlinear processing on the outputted (j+n)-level dimension feature using a nonlinear activation function, for example, the ReLU function, to ensure that the output of the non-deep input convolution layer is differentiable, thereby improving accuracy of subsequently outputted features.

Step S402: The image object detection apparatus performs, using a non-deep nonlinear transformation convolution layer of the non-deep feature extraction model, a feature extraction operation on the (j+n)-level dimension feature of the detection image obtained in step S401, to obtain a (j+n)-level convolved feature of the detection image.

The non-deep nonlinear transformation convolution layer is a depthwise separable convolution layer with a 3*3 convolution kernel size and with a nonlinear activation function, where the setting of a depthwise separable convolution layer may greatly reduce the computation amount of the non-deep nonlinear transformation convolution layer, thereby further greatly reducing a size of the deep feature extraction model. The non-deep nonlinear transformation convolution layer herein may alternatively be a depthwise separable atrous convolution layer.

Because features outputted by the deep nonlinear transformation convolution layer are directly inputted into the non-deep nonlinear transformation convolution layer, the non-deep feature extraction model herein only needs to use one non-deep nonlinear transformation convolution layer to perform feature extraction, and does not need to set a plurality of nonlinear transformation convolution layers to perform feature extraction.

In this step, the non-deep nonlinear transformation convolution layer first performs the feature extraction operation on the (j+n)-level dimension feature of the detection image, and the non-deep nonlinear transformation convolution layer then performs nonlinear processing on the outputted (j+n)-level convolved feature using a nonlinear activation function, for example, the ReLU function, to ensure that the output of the non-deep nonlinear transformation convolution layer is differentiable, thereby improving accuracy of subsequently outputted features.

Step S403: The image object detection apparatus performs, using a non-deep output convolution layer of the non-deep feature extraction model, a dimension decreasing operation on the (j+n)-level convolved feature of the detection image obtained in step S402, to obtain a (j+n)-level feature of the detection image.

The non-deep output convolution layer is a standard convolution layer with a 1*1 convolution kernel size and without an activation function. Herein, the non-deep output convolution layer may restore the dimension increased in step S401 to a dimension inputted into the non-deep input convolution layer; and no activation function is set in the non-deep output convolution layer, to avoid the activation function from causing loss of outputted features. The (j+n)-level feature of the detection image outputted by the non-deep output convolution layer is to conform to the j-level non-deep feature map framework.

In this way, a process of performing non-deep feature extraction on the (j−1+n)-level feature of the detection image using the j-level non-deep feature map framework, to obtain the (j+n)-level feature of the detection image, is completed. An (n+1)-level feature to the (j+n)-level feature of the detection image may be obtained by repeating step S401 to step S403.

In this embodiment, a deep feature extraction model and a non-deep feature extraction model may be respectively used based on a feature extraction depth of the detection image, to greatly reduce the computation amount of the feature extraction operation, and a value of n herein may be set according to a user's requirement. If the computation amount of the feature extraction operation is relatively large, the value of n may be properly lowered, and if accuracy of the feature extraction needs to be improved, the value of n may be properly increased.

In step S204, the image object detection apparatus performs, based on a preset feature prediction model, an information regression operation on an a-level feature to the (m+n)-level feature of the detection image that are obtained in step S202 and step S203, to obtain an object type information and an object position information of an object in the detection image, where a is an integer that is less than n and greater than or equal to 2. The feature prediction model herein functions as a regressor, and is configured to obtain the object type and the object position of the object in the detection image. The object type herein is marked using a classification probability. For example, a probability that a specific object is a cat is 80%, and a probability that the object is a dog is 20%.

In this embodiment, the feature prediction model includes a feature classification convolution layer and a feature output convolution layer.

Figure 5:
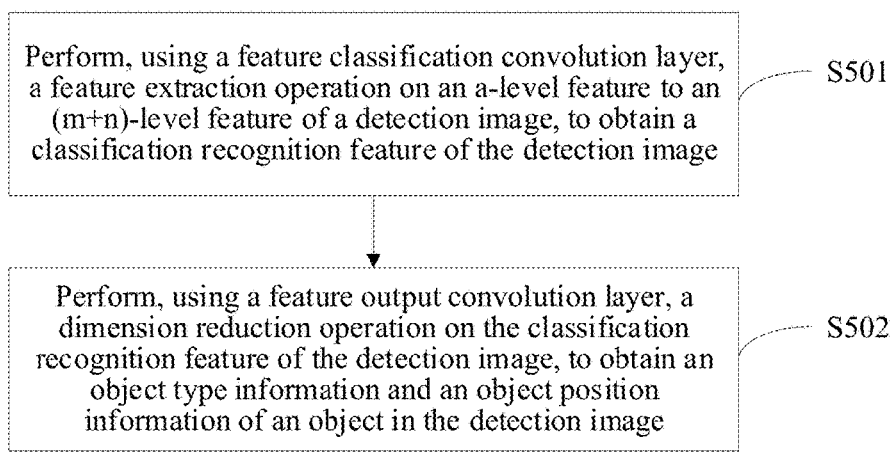
FIG. 5 is a flowchart of the image object detection method according to an embodiment of this application.

Specifically, FIG. 5 is a flowchart of step S204 of the image object detection method shown in FIG. 2 according to an embodiment of this application. Step S204 includes the following steps.

Step S501: The image object detection apparatus performs, using a feature classification convolution layer of the feature prediction model, a feature extraction operation on the a-level feature to the (m+n)-level feature of the detection image, to obtain a classification recognition feature of the detection image.

The feature classification convolution layer is a depthwise separable convolution layer with a 3*3 convolution kernel size and without an activation function. Because feature sizes of a 1-level feature to an (a−1)-level feature of the detection image are relatively large, and the features are usually not image objects to be detected, previous-level features of the a-level feature of the detection image are all discarded.

The image object detection apparatus then performs a feature extraction operation on the a-level feature to the (m+n)-level feature of the detection image to obtain the classification recognition feature of the detection image, to help to perform a subsequent prediction operation of an object type and an object position of the object in the detection image.

Specifically, some of the a-level feature to the (m+n)-level feature may be selected according to a user's requirement for performing the feature extraction operation, to further reduce the computation amount of the feature extraction operation.

Step S502: The image object detection apparatus performs, using a feature output convolution layer of the feature prediction model, a dimension decreasing operation on the classification recognition feature of the detection image obtained in step S501, to obtain an object type information and an object position information of the object in the detection image.

The feature output convolution layer is a standard convolution layer with a 1*1 convolution kernel size and without an activation function. Herein, no activation function is set in the feature output convolution layer, to avoid the activation function from causing loss of outputted features.

Herein, the outputted object type information may indicate an object such as a person, a vehicle, and a house, and the outputted object position information may be parameters such as center coordinates of the object and the length and the width of an object box.

In this way, the image object detection process of the image object detection method of this embodiment is completed.

Based on the embodiment shown in FIG. 1, in the image object detection method of this embodiment, the deep feature extraction model and the non-deep feature extraction model use different structures, and the first deep nonlinear transformation convolution layer and the second deep nonlinear transformation convolution layer in the deep feature extraction model also use different results. In this way, an extraction speed of an object feature of the detection image may be maximized, and the requirement for configuration resource may be further reduced, thereby implementing setup of an object detection function on a mobile terminal.

Figure 6:
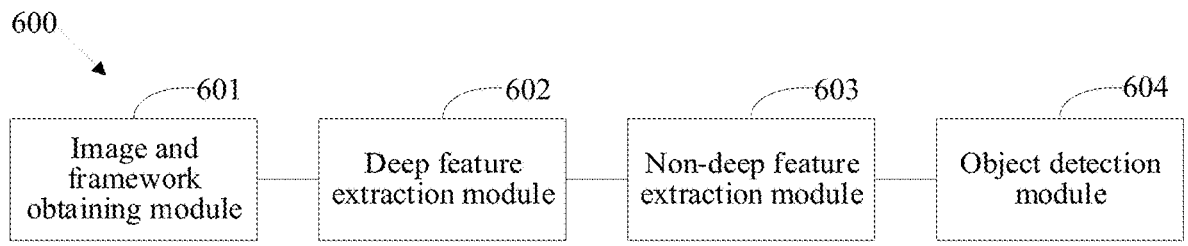
FIG. 6 is a schematic structural diagram of an image object detection apparatus according to an embodiment of this application.

An embodiment of this application further provides an image object detection apparatus. FIG. 6 is a schematic structural diagram of an image object detection apparatus according to an embodiment of this application. The image object detection apparatus of this embodiment may perform the image object detection method shown in FIG. 1, and the image object detection apparatus 600 of this embodiment includes an image and framework obtaining module 601, a deep feature extraction module 602, a non-deep feature extraction module 603, and an object detection module 604.

The image and framework obtaining module 601 is configured to obtain a detection image, an n-level deep feature map framework, and an m-level non-deep feature map framework, n being an integer greater than or equal to 2, m being an integer greater than or equal to 1, and the feature map frameworks each including a feature size and a feature dimension that are outputted; the deep feature extraction module 602 is configured to perform, based on a deep feature extraction model, deep feature extraction on an (i−1)-level feature of the detection image using an i-level deep feature map framework, to obtain an i-level feature of the detection image, i being a positive integer less than or equal to n; the non-deep feature extraction module 603 is configured to perform, based on a non-deep feature extraction model, non-deep feature extraction on a (j−1+n)-level feature of the detection image using a j-level non-deep feature map framework, to obtain a (j+n)-level feature of the detection image, j being a positive integer less than or equal to m; and the object detection module 604 is configured to perform, based on a feature prediction model, an information regression operation on an a-level feature to an (m+n)-level feature of the detection image, to obtain an object type and an object position of the object in the detection image, a being an integer less than n and greater than or equal to 2.

When the image object detection apparatus 600 of this embodiment is used, the image and framework obtaining module 601 first obtains a detection image on which object detection needs to be performed, and an n-level deep feature map framework and an m-level non-deep feature map framework that perform object detection on the detection image. In this embodiment, n is an integer greater than or equal to 2, and m is an integer greater than or equal to 1. That is, a feature extraction operation needs to be performed on the detection image for at least three times.

To perform precise and comprehensive object detection on the detection image, feature extraction operations at a plurality of levels, for example, m+n levels, need to be performed on the detection image. A feature size of a lower level is certainly smaller than a feature size of a higher level, so that a feature extraction operation on the lower level may be performed on a feature outputted by a feature extraction operation on the higher level. For a large-size feature extraction operation, because few higher-level feature extraction operations are performed before, a deep feature extraction model and a deep feature map framework need to be used for performing feature extraction. For a small-size feature extraction operation, because higher-level feature extraction operations have been performed for a plurality of times before, only a non-deep feature extraction model and a non-deep feature map framework need to be used to perform feature extraction.

Herein, the deep feature map framework is a recognition parameter used for performing feature recognition on the detection image or a lower-level feature corresponding to the detection image, and the deep feature map framework may include a feature size and a feature dimension that are outputted at each deep feature level. The non-deep feature map framework is a recognition parameter used for performing feature recognition on a lower-level feature corresponding to the detection image, and the non-deep feature map framework may include a feature size and a feature dimension that are outputted at each non-deep feature level.

The deep feature extraction module 602 then performs, based on a preset deep feature extraction model, deep feature extraction on an (i−1)-level feature of the detection image using an i-level deep feature map framework, to obtain an i-level feature of the detection image, i being a positive integer less than or equal to n.

That is, the deep feature extraction module 602 performs deep feature extraction on pixels of the detection image based on the preset deep feature extraction model, to obtain a 1-level feature of the detection image corresponding to a 1-level deep feature map framework; then the deep feature extraction module performs deep feature extraction on the 1-level feature of the detection image, to obtain a 2-level feature of the detection image corresponding to a 2-level deep feature map framework . . . ; and eventually, the image object detection apparatus performs deep feature extraction on an (n−1)-level feature of the detection image, to obtain an n-level feature of the detection image corresponding to an n-level deep feature map framework. In this way, the 1-level feature to the n-level feature of the detection image are obtained.

The non-deep feature extraction module 603 then performs, based on a preset non-deep feature extraction model, non-deep feature extraction on a (j−1+n)-level feature of the detection image using a j-level non-deep feature map framework, to obtain a (j+n)-level feature of the detection image, j being a positive integer less than or equal to m.

That is, the non-deep feature extraction module 603 performs non-deep feature extraction on the n-level feature of the detection image based on the preset non-deep feature extraction model, to obtain an (n+1)-level feature of the detection image corresponding to a 1-level non-deep feature map framework; then the non-deep feature extraction module performs non-deep feature extraction on the (n+1)-level feature of the detection image, to obtain an (n+2)-level feature of the detection image corresponding to a 2-level non-deep feature map framework . . . ; and eventually, the image object detection apparatus performs deep feature extraction on an (n+m−1)-level feature of the detection image, to obtain an (m+n)-level feature of the detection image corresponding to an (m+n)-level deep feature map framework. In this way, the (n+1)-level feature to the (m+n)-level feature of the detection image are obtained.

Eventually, the object detection module 604 performs, based on a preset feature prediction model, an information regression operation on an a-level feature to an (m+n)-level feature of the detection image, to obtain an object type information and an object position information of an object in the detection image, a being an integer less than n and greater than or equal to 2.

Specifically, because feature sizes of the 1-level feature to an (a−1)-level feature of the detection image are relatively large, it is meaningless to perform feature classification and recognition. Therefore, the object detection module 604 directly discards the 1-level feature to the (a−1)-level feature of the detection image. The object detection module 604 performs feature classification and recognition on the a-level feature to the (m+n)-level feature of the detection image, to obtain object type information (for example, a person, a vehicle, and a house) and object position information (for example, center coordinates of an object, and the length and the width of an object box) of the detection image corresponding to the features.

In this way, the image object detection process of the image object detection apparatus 600 of this embodiment is completed.

According to the image object detection apparatus of this embodiment, extraction and feature recognition are performed, based on a deep feature extraction model and a non-deep feature extraction model, on a plurality of features of different sizes of the same detection image. The small-size features of the detection image may be directly extracted based on the large-size features of the detection image, so that an overall speed of feature extraction is relatively high, and a requirement for the configuration resource is relatively low.

Figure 7:
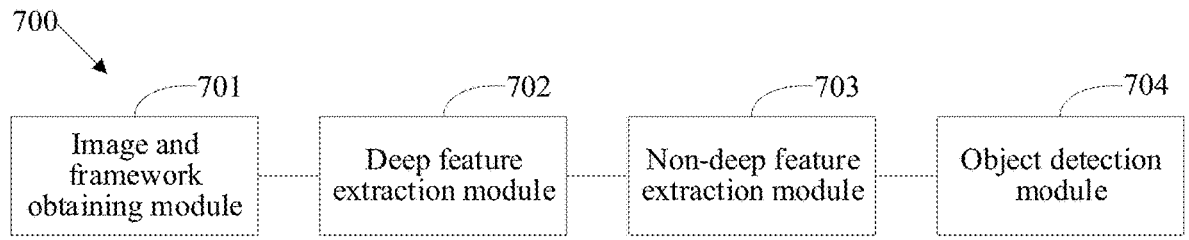
FIG. 7 is a schematic structural diagram of an image object detection apparatus according to another embodiment of this application.

FIG. 7 is a schematic structural diagram of an image object detection apparatus according to another embodiment of this application. The image object detection apparatus of this embodiment may perform the image object detection method shown in FIG. 2, and the image object detection apparatus 700 of this embodiment includes an image and framework obtaining module 701, a deep feature extraction module 702, a non-deep feature extraction module 703, and an object detection module 704.

The image and framework obtaining module 701 is configured to obtain a detection image, an n-level deep feature map framework, and an m-level non-deep feature map framework, where the feature map frameworks each including a feature size and a feature dimension that are outputted; the deep feature extraction module 702 is configured to perform, based on a deep feature extraction model, deep feature extraction on an (i−1)-level feature of the detection image using an i-level deep feature map framework, to obtain an i-level feature of the detection image; the non-deep feature extraction module 703 is configured to perform, based on a non-deep feature extraction model, non-deep feature extraction on a (j−1+n)-level feature of the detection image using a j-level non-deep feature map framework, to obtain a (j+n)-level feature of the detection image; and the object detection module 704 is configured to perform, based on a feature prediction model, an information regression operation on an a-level feature to an (m+n)-level feature of the detection image, to obtain an object type and an object position of the object in the detection image.

Figure 8:
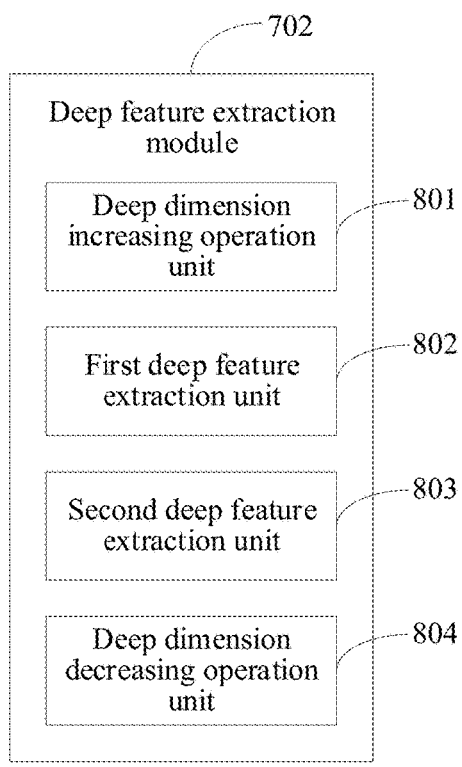
FIG. 8 is a schematic structural diagram of a deep feature extraction module of the image object detection apparatus shown in FIG. 7 according to an embodiment of this application.

FIG. 8 is a schematic structural diagram of a deep feature extraction module of the image object detection apparatus shown in FIG. 7 according to an embodiment of this application. The deep feature extraction module 702 includes a deep dimension increasing operation unit 801, a first deep feature extraction unit 802, a second deep feature extraction unit 803, and a deep dimension decreasing operation unit 804.

In this embodiment, the deep feature extraction model includes a deep input convolution layer, a first deep nonlinear transformation convolution layer, a second deep nonlinear transformation convolution layer, and a deep output convolution layer.

The deep dimension increasing operation unit 801 is configured to perform a dimension increasing operation on the (i−1)-level feature of the detection image using the deep input convolution layer, to obtain an i-level dimension feature of the detection image; the first deep feature extraction unit 802 is configured to perform a first feature extraction operation on the i-level dimension feature of the detection image using the first deep nonlinear transformation convolution layer, to obtain an i-level first convolved feature of the detection image; the second deep feature extraction unit 803 is configured to perform a second feature extraction operation on the i-level first convolved feature of the detection image using the second deep nonlinear transformation convolution layer, to obtain an i-level second convolved feature of the detection image; and the deep dimension decreasing operation unit 804 is configured to perform a dimension decreasing operation on the i-level second convolved feature of the detection image using the deep output convolution layer, to obtain the i-level feature of the detection image.

Figure 9:
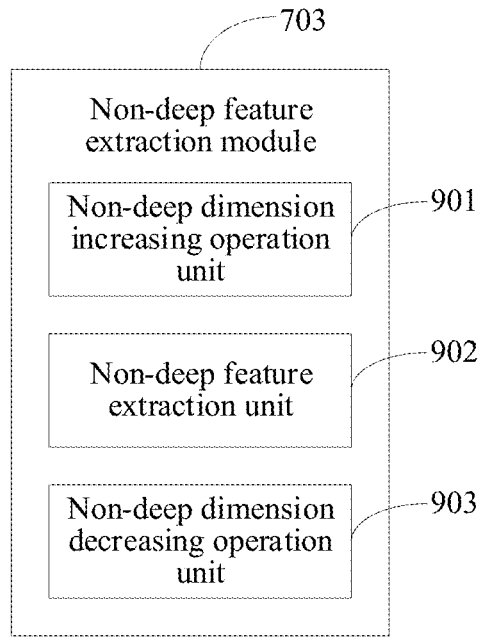
FIG. 9 is a schematic structural diagram of a non-deep feature extraction module of the image object detection apparatus shown in FIG. 7 according to an embodiment of this application.

FIG. 9 is a schematic structural diagram of a non-deep feature extraction module of the image object detection apparatus shown in FIG. 7 according to an embodiment of this application. The non-deep feature extraction module 703 includes a non-deep dimension increasing operation unit 901, a non-deep feature extraction unit 902, and a non-deep dimension decreasing operation unit 903.

In this embodiment, the non-deep feature extraction model includes a non-deep input convolution layer, a non-deep nonlinear transformation convolution layer, and a non-deep output convolution layer.

The non-deep dimension increasing operation unit 901 is configured to perform a dimension increasing operation on the (j−1+n)-level feature of the detection image using the non-deep input convolution layer, to obtain a (j+n)-level dimension feature of the detection image; the non-deep feature extraction unit 902 is configured to perform a feature extraction operation on the (j+n)-level dimension feature of the detection image using the non-deep nonlinear transformation convolution layer, to obtain a (j+n)-level convolved feature of the detection image; and the non-deep dimension decreasing operation unit 903 is configured to perform a dimension decreasing operation on the (j+n)-level convolved feature of the detection image using the non-deep output convolution layer, to obtain the (j+n)-level feature of the detection image.

Figure 10:
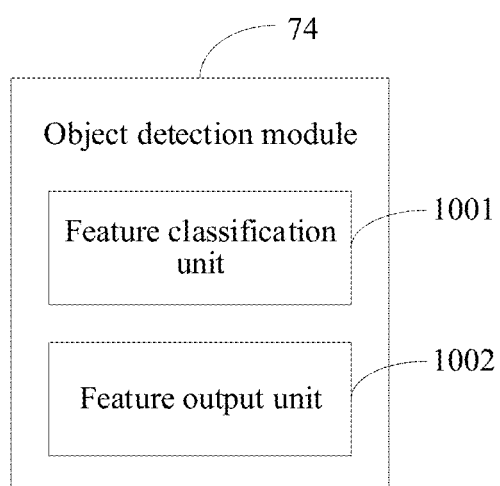
FIG. 10 is a schematic structural diagram of an object detection module of the image object detection apparatus shown in FIG. 7 according to an embodiment of this application.

FIG. 10 is a schematic structural diagram of an object detection module of the image object detection apparatus shown in FIG. 7 according to an embodiment of this application. The object detection module 704 includes a feature classification unit 1001 and a feature output unit 1002.

In this embodiment, the feature prediction model includes a feature classification convolution layer and a feature output convolution layer.

The feature classification unit 1001 is configured to perform a feature extraction operation on the a-level feature to the (m+n)-level feature of the detection image using the feature classification convolution layer, to obtain a classification recognition feature of the detection image; and the feature output unit 1002 is configured to perform a dimension decreasing operation on the classification recognition feature of the detection image using the feature output convolution layer, to obtain the object type and the object position of the object in the detection image.

When the image object detection apparatus 700 of this embodiment is used, the image and framework obtaining module 701 first obtains a detection image on which object detection needs to be performed, and an n-level deep feature map framework and an m-level non-deep feature map framework that perform object detection on the detection image. In this embodiment, n is an integer greater than or equal to 2, and m is an integer greater than or equal to 1. That is, a feature extraction operation needs to be performed on the detection image for at least three times.

Herein, the deep feature map framework is a recognition parameter used for performing feature recognition on the detection image or a lower-level feature corresponding to the detection image, and the deep feature map framework may include a feature size and a feature dimension that are outputted at each deep feature level. The non-deep feature map framework is a recognition parameter used for performing feature recognition on a lower-level feature corresponding to the detection image, and the non-deep feature map framework may include a feature size and a feature dimension that are outputted at each non-deep feature level.

The deep feature extraction module 702 then performs, based on a preset deep feature extraction model, deep feature extraction on an (i−1)-level feature of the detection image using an i-level deep feature map framework, to obtain an i-level feature of the detection image, i being a positive integer less than or equal to n.

Specifically, a process of the deep feature extraction includes:

The deep dimension increasing operation unit 801 of the deep feature extraction module 702 performs, using a deep input convolution layer of the deep feature extraction model, a dimension increasing operation on the (i−1)-level feature of the detection image, to obtain an i-level dimension feature of the detection image.

The deep input convolution layer is a standard convolution layer with a 1*1 convolution kernel size and with a nonlinear activation function, where a relatively large quantity of channels, such as 4 to 6, may be set for the deep input convolution layer. In this way, a dimension of an inputted feature may be increased while ensuring a feature size of the detection image, thereby resolving a problem of feature loss of the detection image.

The quantity of channels of the deep input convolution layer is used for representing a quantity of feature extraction patterns for performing feature extraction on low-level features of the detection image, and the convolution kernel size of the deep input convolution layer is used for adjusting complexity of a deep neural network model.

For example, the inputted (i−1)-level feature of the detection image is a 32*32*3 feature point matrix, where 3 is a quantity of input channels of the detection image, for example, a red pixel intensity value, a blue pixel intensity value, and a green pixel intensity value. If the convolution kernel size of the deep input convolution layer is set to 1*1, an outputted feature size of the deep input convolution layer is 32*32. That is, a feature map with a size of 32*32 may be obtained using a 1*1 convolution kernel to sequentially traverse a 32*32 feature point matrix, and if the quantity of channels of the deep input convolution layer is 6, an obtained output of the deep input convolution layer is a 32*32*18 i-level dimension feature. In this way, a dimension feature of the detection image with a higher dimension is obtained without changing the outputted feature size.

The deep input convolution layer then performs nonlinear processing on the outputted i-level dimension feature using a nonlinear activation function, for example, a ReLU function, to ensure that the output of the deep input convolution layer is differentiable, thereby improving accuracy of subsequently outputted features.

The first deep feature extraction unit 802 of the deep feature extraction module 702 performs, using a first deep nonlinear transformation convolution layer of the deep feature extraction model, a first feature extraction operation on the i-level dimension feature of the detection image, to obtain an i-level first convolved feature of the detection image.

The first deep nonlinear transformation convolution layer is a depthwise separable convolution layer with a 3*3 convolution kernel size and with a nonlinear activation function, where the setting of a depthwise separable convolution layer may greatly reduce a computation amount of the first deep nonlinear transformation convolution layer, thereby further greatly reducing a size of the deep feature extraction model.

The depthwise separable convolution layer may implement spatial convolution while maintaining the channels separated. For example, if a standard convolution layer with a 3*3 convolution kernel size has 16 input channels and 32 output channels, 32 3*3 convolution kernels traverse each piece of data in the 16 channels, and 16*32*32*3=4608 parameters need to be set to perform convolution computation. For a depthwise separable convolution layer with a 3*3 convolution kernel size, one 3*3 convolution kernel is used to traverse data of the 16 channels to obtain 16 feature maps, and 32 1*1 convolution kernels are then used to traverse the 16 feature maps. In this way, only 16*3*3+16+32*1+1=656 parameters need to be set to complete the convolution computation.

The first deep nonlinear transformation convolution layer first performs the first feature extraction operation on the i-level dimension feature of the detection image, and the first deep nonlinear transformation convolution layer then performs nonlinear processing on the outputted i-level first convolved feature using a nonlinear activation function, for example, the ReLU function, to ensure that the output of the first deep nonlinear transformation convolution layer is differentiable, thereby improving accuracy of subsequently outputted features.

The second deep feature extraction unit 803 of the deep feature extraction module 702 performs, using a second deep nonlinear transformation convolution layer of the deep feature extraction model, a second feature extraction operation on the i-level first convolved feature of the detection image, to obtain an i-level second convolved feature of the detection image.

The second deep nonlinear transformation convolution layer is a depthwise separable atrous convolution layer with a 3*3 convolution kernel size and with a nonlinear activation function, where the setting of the depthwise separable atrous convolution layer may further increase a receptive field of each basic feature unit of the detection image while greatly reducing the computation amount of the second deep nonlinear transformation convolution layer, to further improve accuracy of the i-level second convolved feature outputted by the second deep nonlinear transformation convolution layer.

The atrous convolutions may set a parameter "dilation rate" in the convolution operation, and the dilation rate defines a spacing between pieces of data when the convolution layer processes data. For a standard convolution layer with a 5*5 convolution kernel size, 25 parameters need to be set. However, if an atrous convolution layer with a 3*3 convolution kernel size and with a dilation rate of 2 is set, only 9 parameters need to be set. That is, based on the 5*5 convolution kernel, one row of data is deleted every other row and one column of data is deleted every other column. Therefore, under the same computation condition, the atrous convolution layer may provide a larger receptive field without increasing the computation amount.

Herein, the atrous convolution layer is set in the second deep nonlinear transformation convolution layer, so that deep feature extraction may be performed again using relatively few resources on the basis that the first deep nonlinear transformation convolution layer has already performed preliminary deep feature extraction, and the problem that the receptive field in the first feature extraction operation is relatively small may be better fixed.

In this step, the second deep nonlinear transformation convolution layer first performs the second feature extraction operation on the i-level first convolved feature of the detection image, and the second deep nonlinear transformation convolution layer then performs nonlinear processing on the outputted i-level second convolved feature using a nonlinear activation function, for example, the ReLU function, to ensure that the output of the second deep nonlinear transformation convolution layer is differentiable, thereby improving accuracy of subsequently outputted features.

The deep dimension decreasing operation unit 804 of the deep feature extraction module 702 performs, using a deep output convolution layer of the deep feature extraction model, a dimension decreasing operation on the i-level second convolved feature of the detection image, to obtain the i-level feature of the detection image.

The deep output convolution layer is a standard convolution layer with a 1*1 convolution kernel size and without an activation function. Herein, the deep output convolution layer may restore the increased dimension to a dimension inputted into the deep input convolution layer; and no activation function is set in the deep output convolution layer, to avoid the activation function from causing loss of outputted features. The i-level feature of the detection image outputted by the deep output convolution layer is to conform to the i-level deep feature map framework.

In this way, a process of performing deep feature extraction on the (i−1)-level feature of the detection image using the i-level deep feature map framework, to obtain the i-level feature of the detection image, is completed. The 1-level feature to the n-level feature of the detection image may be obtained by repeating the foregoing dimension increasing operation, the first feature extraction operation, the second feature extraction operation, and the dimension decreasing operation.

The non-deep feature extraction module 703 then performs, based on a preset non-deep feature extraction model, non-deep feature extraction on a (j−1+n)-level feature of the detection image using a j-level non-deep feature map framework, to obtain a (j+n)-level feature of the detection image, j being a positive integer less than or equal to m.

Specifically, a process of the non-deep feature extraction includes:

The non-deep dimension increasing operation unit 901 of the non-deep feature extraction module 703 performs, using a non-deep input convolution layer of the non-deep feature extraction model, a dimension increasing operation on the (j−1+n)-level feature of the detection image, to obtain a (j+n)-level dimension feature of the detection image.

The non-deep input convolution layer is a standard convolution layer with a 1*1 convolution kernel size and with a nonlinear activation function, where a relatively large quantity of channels, such as 4 to 6, may be set for the non-deep input convolution layer. In this way, a dimension of an inputted feature may be increased while ensuring a feature size of the detection image, thereby resolving a problem of feature loss of the detection image.

The non-deep input convolution layer then performs nonlinear processing on the outputted (j+n)-level dimension feature using a nonlinear activation function, for example, the ReLU function, to ensure that the output of the non-deep input convolution layer is differentiable, thereby improving accuracy of subsequently outputted features.

The non-deep feature extraction unit 902 of the non-deep feature extraction module 703 performs, using a non-deep nonlinear transformation convolution layer of the non-deep feature extraction model, a feature extraction operation on the (j+n)-level dimension feature of the detection image, to obtain a (j+n)-level convolved feature of the detection image.

The non-deep nonlinear transformation convolution layer is a depthwise separable convolution layer with a 3*3 convolution kernel size and with a nonlinear activation function, where the setting of a depthwise separable convolution layer may greatly reduce the computation amount of the non-deep nonlinear transformation convolution layer, thereby further greatly reducing a size of the deep feature extraction model. The non-deep nonlinear transformation convolution layer herein may alternatively be a depthwise separable atrous convolution layer.

Because features outputted by the deep nonlinear transformation convolution layer are directly inputted into the non-deep nonlinear transformation convolution layer, the non-deep feature extraction model herein only needs to use one non-deep nonlinear transformation convolution layer to perform feature extraction, and does not need to set a plurality of nonlinear transformation convolution layers to perform feature extraction.

In this step, the non-deep nonlinear transformation convolution layer first performs the feature extraction operation on the (j+n)-level dimension feature of the detection image, and the non-deep nonlinear transformation convolution layer then performs nonlinear processing on the outputted (j+n)-level convolved feature using a nonlinear activation function, for example, the ReLU function, to ensure that the output of the non-deep nonlinear transformation convolution layer is differentiable, thereby improving accuracy of subsequently outputted features.

The non-deep dimension decreasing operation unit 903 of the non-deep feature extraction module 703 performs, using a non-deep output convolution layer of the non-deep feature extraction model, a dimension decreasing operation on the (j+n)-level convolved feature of the detection image, to obtain the (j+n)-level feature of the detection image.

The non-deep output convolution layer is a standard convolution layer with a 1*1 convolution kernel size and without an activation function. Herein, the non-deep output convolution layer may restore the increased dimension to a dimension inputted into the non-deep input convolution layer; and no activation function is set in the non-deep output convolution layer, to avoid the activation function from causing loss of outputted features. The (j+n)-level feature of the detection image outputted by the non-deep output convolution layer is to conform to the j-level non-deep feature map framework.

In this way, a process of performing non-deep feature extraction on the (j−1+n)-level feature of the detection image using the j-level non-deep feature map framework, to obtain the (j+n)-level feature of the detection image, is completed. The (n+1)-level feature to the (j+n)-level feature of the detection image may be obtained by repeating the foregoing dimension increasing operation, the feature extraction operation, and the dimension decreasing operation.

In this embodiment, a deep feature extraction model and a non-deep feature extraction model may be respectively used based on a feature extraction depth of the detection image, to greatly reduce the computation amount of the feature extraction operation, and a value of n herein may be set according to a user's requirement. If the computation amount of the feature extraction operation is relatively large, the value of n may be properly lowered, and if accuracy of the feature extraction needs to be improved, the value of n may be properly increased.

Eventually, the object detection module 704 performs, based on a preset feature prediction model, an information regression operation on an a-level feature to an (m+n)-level feature of the detection image, to obtain an object type information and an object position information of an object in the detection image, a being an integer less than n and greater than or equal to 2. The feature prediction model herein functions as a regressor, and is configured to obtain the object type and the object position of the object in the detection image. The object type herein may be marked using a classification probability. For example, a probability that a specific object is a cat is 80%, and a probability that the object is a dog is 20%.

Specifically, an object detection process includes:

The feature classification unit 1001 of the object detection module 704 performs, using a feature classification convolution layer of the feature prediction model, a feature extraction operation on the a-level feature to the (m+n)-level feature of the detection image, to obtain a classification recognition feature of the detection image.

The feature classification convolution layer is a depthwise separable convolution layer with a 3*3 convolution kernel size and without an activation function. Because feature sizes of a 1-level feature to an (a−1)-level feature of the detection image are relatively large, and the features are usually not image objects to be detected, previous-level features of the a-level feature of the detection image are all discarded.

The feature classification unit 1001 performs a feature extraction operation on the a-level feature to the (m+n)-level feature of the detection image to obtain the classification recognition feature of the detection image, to help to perform a subsequent prediction operation of an object type information and an object position information of an object in the detection image.

Specifically, the feature classification unit may select some of the a-level feature to the (m+n)-level feature according to a user's requirement for performing the feature extraction operation, to further reduce the computation amount of the feature extraction operation.

The feature output unit 1002 of the object detection module 704 performs, using a feature output convolution layer of the feature prediction model, a dimension decreasing operation on the classification recognition feature of the detection image, to obtain the object type information and the object position information of an object of the detection image.

The feature output convolution layer is a standard convolution layer with a 1*1 convolution kernel size and without an activation function. Herein, no activation function is set in the feature output convolution layer, to avoid the activation function from causing loss of outputted features.

Herein, the outputted object type information may indicate an object such as a person, a vehicle, and a house, and the outputted object position information may be parameters such as center coordinates of the object and the length and the width of an object box.

In this way, the image object detection process of the image object detection apparatus 700 of this embodiment is completed.

Based on the embodiment shown in FIG. 6, in the image object detection apparatus of this embodiment, the deep feature extraction model and the non-deep feature extraction model use different structures, and the first nonlinear transformation convolution layer and the second nonlinear transformation convolution layer in the deep feature extraction model also use different results. In this way, an extraction speed of an object feature of the detection image may be maximized, and the requirement for a configuration resource may be further reduced, thereby implementing setup of an object detection function on a mobile terminal.

Figure 11:
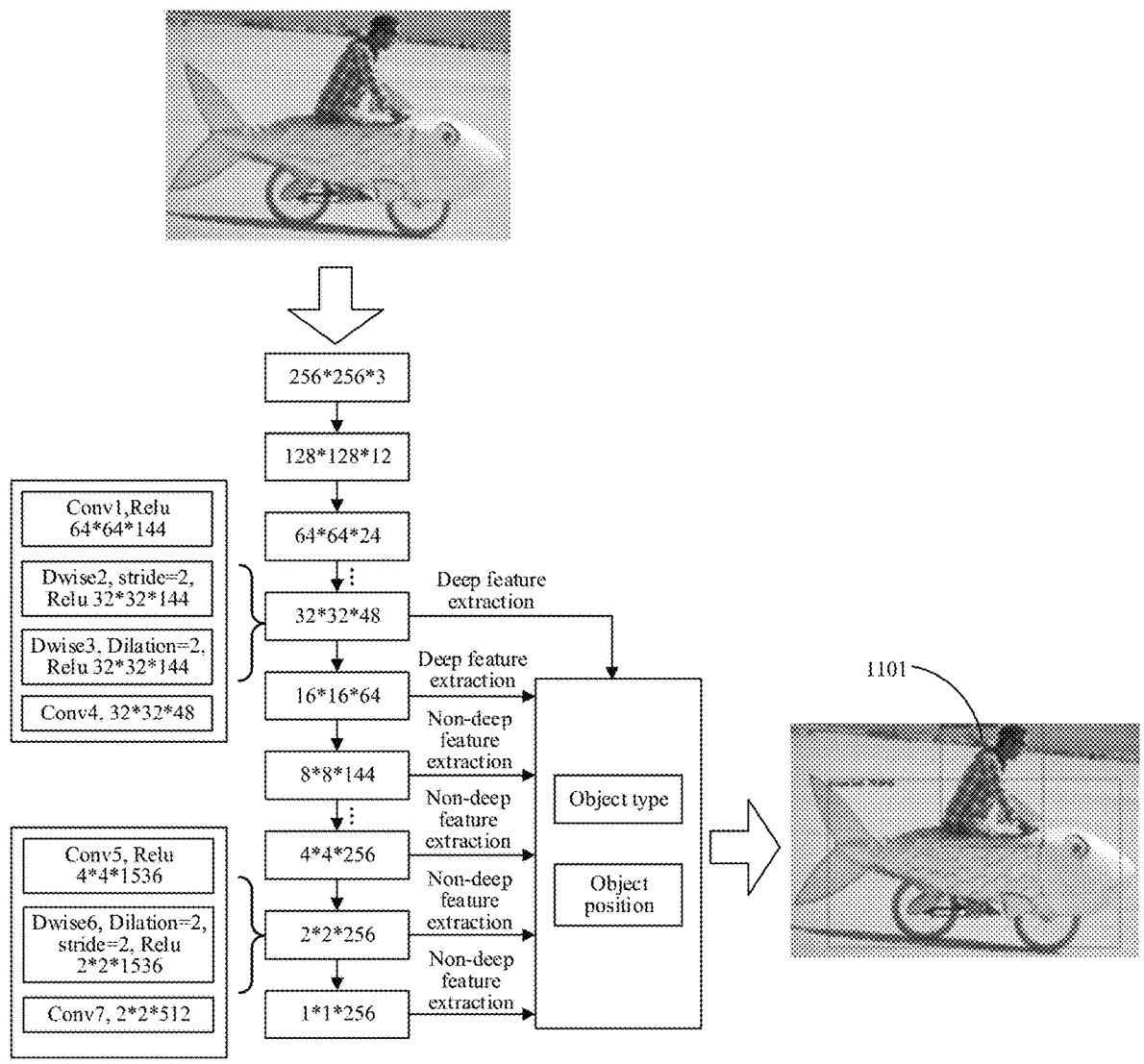
FIG. 11 is a schematic diagram of usage of a specific implementation of an image object detection method and an image object detection apparatus according to an embodiment of this application.

A working principle of the image object detection method and the image object detection apparatus of this application is described below using a specific embodiment. FIG. 11 is a schematic diagram of usage of a specific embodiment of an image object detection method and an image object detection apparatus according to an embodiment of this application.

The image object detection apparatus of this specific embodiment may be disposed in an electronic device, for example, a mobile terminal on which an image object recognition application is installed, object features in an image may be quickly extracted by the mobile terminal, and a requirement for a configuration resource of the mobile terminal is relatively low. The image object detection performed by the image object detection apparatus of this specific embodiment include the following steps.

Step S1101: Obtain a detection image, an n-level deep feature map framework, and an m-level non-deep feature map framework. In this embodiment, the deep feature map frameworks include deep feature map frameworks of different levels with feature sizes and dimensions such as 128*128*12, 64*64*24, 32*32*48, and 16*16*64. Herein, 128*128 refers to a feature size of the feature map framework, and 12 refers to a dimension of the feature map framework. Certainly, more deep feature map frameworks may be further included herein. For example, 64*64*32 and 64*64*40 deep feature map frameworks may be added between 64*64*24 and 32*32*48 deep feature map frameworks. In this embodiment, a 4-level deep feature map framework and a 4-level non-deep feature map framework are obtained.

Step S1102: Perform, based on a deep feature extraction model, deep feature extraction on an (i−1)-level feature of the detection image using an i-level deep feature map framework, to obtain an i-level feature of the detection image. If 4-level deep features are set in the detection image in this embodiment, in an actual application, a deep feature level of the detection image is to be higher than 4.

The image object detection apparatus performs, based on a deep feature extraction model, deep feature extraction on pixels (a pixel size and a dimension are 256*256*3) of the detection image, to obtain a 1-level feature (a feature size and a feature dimension are 128*128*12) of the detection image corresponding to a 1-level deep feature map framework; the image object detection apparatus then performs deep feature extraction on the 1-level feature of the detection image, to obtain a 2-level feature (a feature size and a feature dimension are 64*64*24) of the detection image corresponding to a 2-level deep feature map framework; the image object detection apparatus then performs deep feature extraction on the 2-level feature of the detection image, to obtain a 3-level feature (a feature size and a feature dimension are 32*32*48) of the detection image corresponding to a 3-level deep feature map framework; and eventually, the image object detection apparatus performs deep feature extraction on the 3-level feature of the detection image, to obtain a 4-level feature (a feature size and a feature dimension are 16*16*64) of the detection image corresponding to a 4-level deep feature map framework.

How to perform deep feature extraction on a detection image is made is described herein using an example in which a 3-level feature of a detection image is obtained. A process of the deep feature extraction includes:

The image object detection apparatus performs a dimension increasing operation on a 2-level feature (a feature size and a feature dimension are 64*64*24) of the detection image using a deep input convolution layer, to obtain a 3-level dimension feature (a feature size and a feature dimension are 64*64*144) of the detection image. The deep input convolution layer herein is a standard convolution layer Conv1 with a 1*1 convolution kernel size and with a nonlinear activation function Relu.

The image object detection apparatus performs, using a first deep nonlinear transformation convolution layer, a first feature extraction operation on the 3-level dimension feature of the detection image, to obtain a 3-level first convolved feature (a feature size and a feature dimension are 32*32*144) of the detection image. Herein, the first deep nonlinear transformation convolution layer is a depthwise separable standard convolution layer Dwise2 with a 3*3 convolution kernel size and with a nonlinear activation function Relu. Because a size of the 3-level first convolved feature is reduced, a convolution stride of the depthwise separable standard convolution layer Dwise2 is 2.

The image object detection apparatus performs, using a second nonlinear transformation convolution layer, a second feature extraction operation on the 3-level first convolved feature of the detection image, to obtain a 3-level second convolved feature (a feature size and a feature dimension are 32*32*144) of the detection image. Herein, the second nonlinear transformation convolution layer is a depthwise separable atrous convolution layer Dwise3 with a 3*3 convolution kernel size and with a nonlinear activation function Relu, where a dilation rate of the depthwise separable atrous convolution layer Dwise3 is 2.

The image object detection apparatus performs, using a deep output convolution layer, a dimension decreasing operation on the 3-level second convolved feature of the detection image, to obtain the 3-level feature (a feature size and a feature dimension are 32*32*48) of the detection image. The deep output convolution layer herein is a standard convolution layer Conv4 with a 1*1 convolution kernel size and without an activation function.

Step S1103: Perform, based on a non-deep feature extraction model, non-deep feature extraction on a (j−1+n)-level feature of the detection image using a j-level non-deep feature map framework, to obtain a (j+n)-level feature of the detection image. If 4 levels of non-deep features are set in the detection image in this embodiment, that is, 8 levels of features are set in the detection image in total, in an actual application, the non-deep feature level of the detection image is to be greater than 4.

The image object detection apparatus performs, based on a non-deep feature extraction model, non-deep feature extraction on a 4-level feature of the detection image, to obtain a 5-level feature (a feature size and a feature dimension are 8*8*144) of the detection image corresponding to a 1-level non-deep feature map framework; the image object detection apparatus then performs non-deep feature extraction on the 5-level feature of the detection image, to obtain a 6-level feature (a feature size and a feature dimension are 4*4*256) of the detection image corresponding to a 2-level non-deep feature map framework; the image object detection apparatus then performs non-deep feature extraction on the 6-level feature of the detection image, to obtain a 7-level feature (a feature size and a feature dimension are 2*2*256) of the detection image corresponding to a 3-level non-deep feature map framework; and eventually, the image object detection apparatus performs non-deep feature extraction on the 7-level feature of the detection image, to obtain an 8-level feature (a feature size and a feature dimension are 1*1*256) of the detection image corresponding to a 4-level non-deep feature map framework.

How to perform non-deep feature extraction on a detection image is described herein using an example in which a 7-level feature of a detection image is obtained. A process of the non-deep feature extraction includes:

The image object detection apparatus performs a dimension increasing operation on a 6-level feature (a feature size and a feature dimension are 4*4*256) of the detection image using a non-deep input convolution layer, to obtain a 7-level dimension feature (a feature size and a feature dimension are 4*4*1536) of the detection image. The non-deep input convolution layer herein is a standard convolution layer Conv5 with a 1*1 convolution kernel size and with a nonlinear activation function Relu.

The image object detection apparatus performs, using a non-deep nonlinear transformation convolution layer, a feature extraction operation on the 7-level dimension feature of the detection image, to obtain a 7-level convolved feature (a feature size and a feature dimension are 2*2*1536) of the detection image. Herein, the non-deep nonlinear transformation convolution layer is a depthwise separable atrous convolution layer Dwise6 with a 3*3 convolution kernel size and with a nonlinear activation function Relu. Because a size of the 7-level convolved feature is reduced, a convolution stride of the depthwise separable atrous convolution layer Dwise6 is 2, and a dilation rate of the depthwise separable atrous convolution layer Dwise6 is 2.

The image object detection apparatus performs, using a non-deep output convolution layer, a dimension decreasing operation on the 7-level convolved feature of the detection image, to obtain the 7-level feature (a feature size and a feature dimension are 2*2*256) of the detection image. The non-deep output convolution layer is a standard convolution layer Conv7 with a 1*1 convolution kernel size and without an activation function.

Step S1104: Perform, based on a feature prediction model, an information regression operation on the 3-level feature to the 8-level feature of the detection image, to obtain an object type information and an object position information of an object in the detection image. A process of obtaining the object type information and the object position information of the object in the detection image includes:

The image object detection apparatus performs, using a feature classification convolution layer, an information regression operation on the 3-level feature to the 8-level feature of the detection image, to obtain a classification recognition feature of the detection image. The feature classification convolution layer is a depthwise separable convolution layer with a 3*3 convolution kernel size and without an activation function.

The image object detection apparatus performs, using a feature output convolution layer, a dimension decreasing operation on the classification recognition feature of the detection image, to obtain the object type information and the object position information of the object in the detection image. The feature output convolution layer is a standard convolution layer with a 1*1 convolution kernel size and without an activation function.

In this way, as shown by 1101 in FIG. 11, an operation of outputting the object type information and the object position information of the object in the image is completed.

The object detection process of the image object detection method and the image object detection apparatus in this specific embodiment optimize all three parts, namely, the deep feature extraction model, the non-deep feature extraction module, and the feature prediction model, to scale down the original feature prediction model from 100 Mb to less than 1 Mb, and the running speed is also improved by over 10 times.

According to the image object detection method and apparatus, and a storage medium of the embodiments of this application, extraction and feature recognition are performed, based on a deep feature extraction model and a non-deep feature extraction model, on a plurality of different sizes of features of the same detection image. The small-size features of the detection image may be directly extracted based on the large-size features of the detection image, so that an overall speed of feature extraction is relatively high, and a requirement for the configuration resource is relatively low. A technical problem that the exiting image object detection method and apparatus have a relatively low running speed and cannot be implemented on a mobile terminal with a relatively small resource configuration is effectively resolved.

Terms such as "component", "module", "system", "interface", and "process" used in the embodiments of this application are generally intended to refer to computer-related entities: hardware, combinations of hardware and software, software, or software being executed. For example, a component may be, but is not limited to, a process running on a processor, a processor, an object, an executable application, an executed thread, a program, and/or a computer. According to the drawings, both an application running on a controller and the controller may be components. One or more components may reside within a process and/or a thread of execution, and a component may be located on one computer and/or distributed between two or more computers.

An embodiment of this application further provides an electronic device, including: one or more processors and a storage apparatus, where the storage apparatus is configured to store one or more executable program instructions; and the one or more processors are configured to execute the one or more executable program instructions in the storage apparatus, to implement the image object detection method according to the foregoing embodiments.

Figure 12:
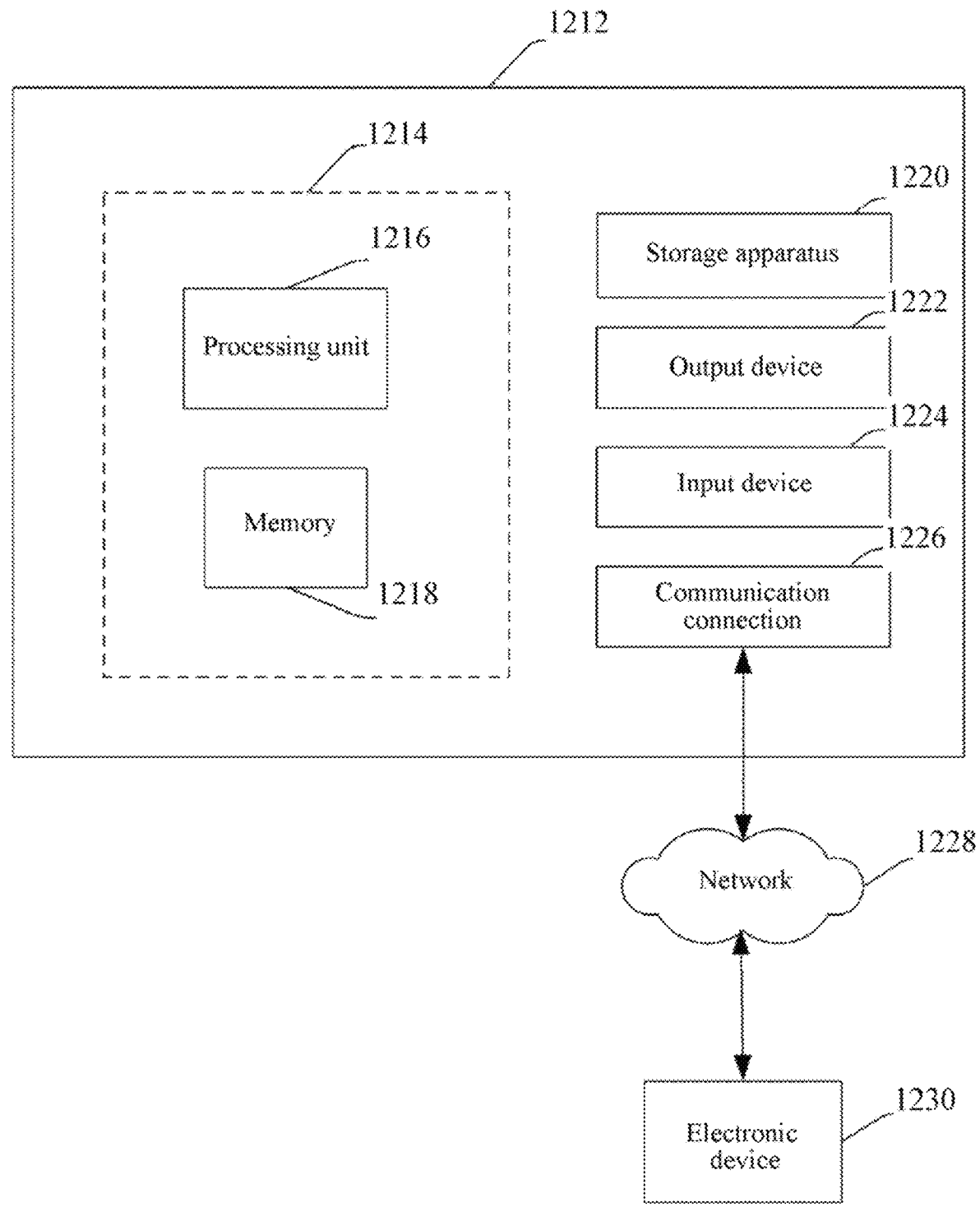
FIG. 12 is a schematic structural diagram of a working environment of an electronic device in which an image object detection apparatus is located according to an embodiment of this application.

FIG. 12 and the later discussion provide a brief and general description about how to implement a working environment of an electronic device in which the image object detection apparatus described in the embodiments of this application is located. The working environment of FIG. 12 is merely an example of a suitable working environment, and is not intended to suggest any limitation to a scope of a purpose or a function of the working environment. The instance of an electronic device 1212 includes, but is not limited to, a wearable device, a head-mounted device, a healthcare platform, a personal computer, a server computer, a handheld or laptop device, a mobile device (for example, a mobile phone, a PDA, or a media player), a multiprocessor system, a consumer electronic device, a minicomputer, a mainframe computer, a distributed computing environment including the foregoing any system or device, and the like.

Although it is not specified, the embodiments are described in a general background that the "computer readable instructions" are executed by one or more electronic devices. The computer readable instructions may be distributed using a computer-readable medium (discussed below). The computer readable instruction may be implemented as a program module, for example, a function, an object, an application programming interface (API), or a data structure for executing a specific task or implementing a specific abstract data type. Typically, functions of the computer readable instruction may be randomly combined or distributed in various environments.

FIG. 12 shows an instance of an electronic device 1212 that includes one or more embodiments of the image object detection apparatus of this application. In a configuration, the electronic device 1212 includes at least one processing unit 1216 and a memory 1218. Based on an exact configuration and type of the electronic device, the memory 1218 may be a volatile memory (for example, a RAM), a nonvolatile memory (for example, a ROM or a flash memory), or a combination thereof. The configuration is shown using a dotted line 1214 in FIG. 12. The processing unit 1216 may be a processor such as a central processing unit (CPU).

In another embodiment, the electronic device 1212 may include an additional feature and/or function. For example, the device 1212 may further include an additional storage apparatus (for example, a removable and/or non-removable storage apparatus), and includes, but is not limited to, a magnetic storage apparatus, an optical storage apparatus, and the like. This additional storage apparatus is shown as a storage apparatus 1220 in FIG. 12. In an embodiment, a computer-readable instruction used for implementing one or more embodiments provided in the present disclosure may be stored in the storage apparatus 1220. The storage apparatus 1220 may further be configured to store other computer-readable instructions for implementing an operating system, an application program, and the like. The computer-readable instruction may be loaded into the memory 1218 to be executed by, for example, the processing unit 1216.

The term "computer-readable medium" used in this text includes a computer storage medium. The computer-readable medium may be included in the electronic device described in the foregoing embodiments, or may exist alone and is not disposed in the electronic device. The computer storage medium includes volatile or nonvolatile, and removable or irremovable mediums that are implemented using any method or technology used for storing information such as a computer-readable instruction, a processor-executable instruction, or other data. When executed by the one or more processors of the electronic device, the foregoing computer-readable instruction or processor-executable instruction causes the electronic device to implement the image object detection method according to the foregoing embodiments. The memory 1218 and the storage apparatus 1220 are instances of the computer storage media. The computer storage medium includes, but is not limited to, a RAM, a ROM, an EEPROM, a flash memory or another memory technology, a CD-ROM, a digital versatile disk (DVD) or another optical storage apparatus, a tape cartridge, a tape, a magnetic disk storage apparatus or another magnetic storage device, or any other medium that can be used for storing expected information and can be accessed by the electronic device 1212. Any such computer storage medium may be a portion of the electronic device 1212.

The electronic device 1212 may further include a communication connection 1226 allowing communication between the electronic device 1212 and another device. The communication connection 1226 may include, but is not limited to, a modem, a network interface card (NIC), an integrated network interface, a radio frequency transmitter/receiver, an infrared port, a USB connection, or another interface configured to connect the electronic device 1212 to another electronic device. The communication connection 1226 may include a wired connection or a wireless connection. The communication connection 1226 may transmit and/or receive a communication medium.

The term "computer-readable medium" may include the communication medium. The communication medium typically includes a computer-readable instruction or other data in a "modulated data signal" such as a carrier or another transmission mechanism, and includes any information transfer medium. The term "modulated data signal" may include such a signal: One or more features of the signal are set or changed by encoding information into the signal.

The electronic device 1212 may include an input device 1224, for example, a keyboard, a mouse, a stylus, a voice input device, a touch input device, an infrared camera, a video input device, and/or any other input device. The device 1212 may further include an output device 1222, for example, one or more displays, a loudspeaker, a printer, and/or any other output device. The input device 1224 and the output device 1222 may be connected to the electronic device 1212 using a wired connection, a wireless connection, or any combination thereof. In an embodiment, an input device or an output device of another electronic device may be used as the input device 1224 or the output device 1222 of the electronic device 1212.

The components of the electronic device 1212 may be connected using various interconnects (for example, a bus). Such interconnect may include a peripheral component interconnect (PCI) (for example, a PCI express), a universal serial bus (USB), a live line (IEEE 1394), an optical bus structure, and the like. In another embodiment, the components of the electronic device 1212 may be interconnected using a network. For example, the memory 1218 may include a plurality of physical memory units located at different physical positions and interconnected using the network.

A person skilled in the art may be aware that a storage device configured to store a computer-readable instruction may be distributed across the network. For example, an electronic device 1230 that may be accessed using a network 1228 may store computer-readable instructions used to implement one or more embodiments provided in this application. The electronic device 1212 may access the electronic device 1230 and download a part or all of the computer-readable instruction for execution. Alternatively, the electronic device 1212 may download a plurality of computer-readable instructions as required, or some instructions may be executed by the electronic device 1212 and some instructions may be executed by the electronic device 1230.

The present disclosure provides various operations of the embodiments. In an embodiment, the one or more operations may constitute one or more computer-readable instructions stored on a computer-readable medium, and the computer-readable instructions enable a computing device to perform the operations when the computer-readable instructions are executed by an electronic device. A sequence in which some or all operations are described are not to be construed as an implication that the operations need to be sequence-related. A person skilled in the art will understand an alternative sequence having the benefits of this specification. Moreover, it is to be understood that not all operations necessarily exist in each embodiment provided in the present disclosure.

In addition, although this application has been shown and described relative to one or more implementations, a person skilled in the art may come up with equivalent variations and modifications based on reading and understanding of the specification and the accompanying drawings. The application includes all of the variations and modifications, which are only limited by the scope of the appended claims. Especially, for functions performed by the foregoing components (such as elements and resources), terms used for describing the components are intended to correspond to any component (unless indicated otherwise) used for performing specified functions (for example, the components are equivalent in functions) of the components, even though structures of the functions are not equivalent to the disclosed structures of functions in the exemplary implementations in this application shown in the specification. In addition, although specific features of this application are disclosed with respect to only one of several implementations, the features may be combined with one or more other feature combinations of other implementations that are desirable for and advantageous to a given or specific application. Moreover, for terms "include", "have", "contain" or variations thereof being used in a specific implementation or claims, the terms are intended to include in a similar manner to that of the term "comprise".

Functional units according to the embodiments of this application may be integrated in one processing module or exist as separate physical units, or two or more units are integrated in one module. The integrated module may be implemented in a form of hardware, or may be implemented in a form of a software functional module. If implemented in the form of a software functional module and sold or used as an independent product, the integrated module may alternatively be stored in a computer-readable storage medium. The foregoing mentioned storage medium may be a read-only memory, a magnetic disk, an optical disc, or the like. The foregoing apparatuses or systems may perform a method in a corresponding method embodiment.

In conclusion, although this application is disclosed above using the embodiments, the sequence numbers in the embodiments are used merely for ease of description, but do not limit the order of the embodiments of this application. Moreover, the foregoing embodiments are not intended to limit this application. A person of ordinary skill in the art may make various variations and modifications without departing from the spirit and scope of this application. Therefore, the protection scope of this application falls within the scope defined by the claims.

What is claimed is:

1. A method for detecting an object in an image, performed by an electronic device, the method comprising:
   obtaining a detection image, an n-level deep feature map framework, and an m-level non-deep feature map framework, n being an integer greater than or equal to 2, m being an integer greater than or equal to 1, and the n-level deep feature map framework and the m-level non-deep feature map framework comprising a feature size and a feature dimension;
   extracting, based on a deep feature extraction model, deep feature from an (i−1)-level feature of the detection image using an i-level deep feature map framework, to obtain an i-level feature of the detection image, i being a positive integer less than or equal to n;
   extracting, based on a non-deep feature extraction model, non-deep feature from a (j−1+n)-level feature of the detection image using a j-level non-deep feature map framework, to obtain a (j+n)-level feature of the detection image, j being a positive integer less than or equal to m; and
   performing, based on a feature prediction model, an information regression operation on an a-level feature to an (m+n)-level feature of the detection image, to obtain object type information and object position information of an object in the detection image, a being an integer less than n and greater than or equal to 2.

2. The method of claim 1, wherein the deep feature extraction model comprises a deep input convolution layer, a first deep nonlinear transformation convolution layer, a second deep nonlinear transformation convolution layer, and a deep output convolution layer; and
   the extracting the deep feature comprises:
   increasing a dimension of the (i−1)-level feature of the detection image using the deep input convolution layer, to obtain an i-level dimension feature of the detection image;
   extracting an i-level first convolved feature from the i-level dimension feature of the detection image using the first deep nonlinear transformation convolution layer;
   extracting an i-level second convolved feature from the i-level first convolved feature using the second deep nonlinear transformation convolution layer; and
   decreasing a dimension of the i-level second convolved feature using the deep output convolution layer, to obtain the i-level feature of the detection image.

3. The method of claim 2, wherein a convolution kernel size of the deep input convolution layer is 1*1, a convolution kernel size of the first deep nonlinear transformation convolution layer is 3*3, a convolution kernel size of the second deep nonlinear transformation convolution layer is 3*3, and a convolution kernel size of the deep output convolution layer is 1*1; and the deep input convolution layer is a standard convolution layer with a nonlinear activation function, the first deep nonlinear transformation convolution layer is a depthwise separable convolution layer with a nonlinear activation function, the second deep nonlinear transformation convolution layer is a depthwise separable convolution layer with a nonlinear activation function, and the deep output convolution layer is a standard convolution layer without an activation function.

4. The method of claim 3, wherein the second deep nonlinear transformation convolution layer is a depthwise separable atrous convolution layer with a nonlinear activation function.

5. The method of claim 4, wherein the depthwise separable atrous convolution layer sets a dilation rate in convolution operation, the dilation rate defines a spacing between data to be processed by the depthwise separable atrous convolution layer.

6. The method of claim 1, wherein the non-deep feature extraction model comprises a non-deep input convolution layer, a non-deep nonlinear transformation convolution layer, and a non-deep output convolution layer; and the extracting the non-deep feature comprises:

increasing a dimension of the (j−1+n)-level feature of the detection image using the non-deep input convolution layer, to obtain a (j+n)-level dimension feature of the detection image;

extracting a (j+n)-level convolved feature from the (j+n)-level dimension feature of the detection image using the non-deep nonlinear transformation convolution layer; and decreasing a dimension of the (j+n)-level convolved feature using the non-deep output convolution layer, to obtain the (j+n)-level feature of the detection image.

7. The method of claim 6, wherein a convolution kernel size of the non-deep input convolution layer is 1*1, a convolution kernel size of the non-deep nonlinear transformation convolution layer is 3*3, and a convolution kernel size of the non-deep output convolution layer is 1*1; and the non-deep input convolution layer is a standard convolution layer with a nonlinear activation function, the non-deep nonlinear transformation convolution layer is a depthwise separable convolution layer with a nonlinear activation function, and the non-deep output convolution layer is a standard convolution layer without an activation function.

8. The method of claim 7, wherein the non-deep nonlinear transformation convolution layer is a depthwise separable atrous convolution layer with a nonlinear activation function.

9. The method according of claim 1, wherein the feature prediction model comprises a feature classification convolution layer and a feature output convolution layer; and the performing the information regression operation comprises:

extracting a classification recognition feature from the a-level feature to the (m+n)-level feature of the detection image using the feature classification convolution layer; and decreasing a dimension of the classification recognition feature using the feature output convolution layer, to obtain the object type information and the object position information of the object in the detection image.

10. The method of claim 9, wherein a convolution kernel size of the feature classification convolution layer is 3*3, and a convolution kernel size of the feature output convolution layer is 1*1; and the feature classification convolution layer is a depthwise separable convolution layer without an activation function, and the feature output convolution layer is a standard convolution layer without an activation function.

11. The method of claim 1, wherein the object position information of the object in the detection image comprises center coordinates of the object or length and width of the object.

12. An apparatus for detecting an object in an image, comprising:

a memory configured to store program code; and a processor, to read the program code and configured to:

obtain a detection image, an n-level deep feature map framework, and an m-level non-deep feature map framework, n being an integer greater than or equal to 2, m being an integer greater than or equal to 1, and the n-level deep feature map framework and the m-level non-deep feature map framework comprising a feature size and a feature dimension;

extract, based on a deep feature extraction model, deep feature from an (i−1)-level feature of the detection image using an i-level deep feature map framework, to obtain an i-level feature of the detection image, i being a positive integer less than or equal to n;

extract, based on a non-deep feature extraction model, non-deep feature from a (j−1+n)-level feature of the detection image using a j-level non-deep feature map framework, to obtain a (j+n)-level feature of the detection image, j being a positive integer less than or equal to m; and perform, based on a feature prediction model, an information regression operation on an a-level feature to an (m+n)-level feature of the detection image, to obtain an object type information and an object position information of an object in the detection image, a being an integer less than n and greater than or equal to 2.

13. The apparatus of claim 12, wherein the deep feature extraction model comprises a deep input convolution layer, a first deep nonlinear transformation convolution layer, a second deep nonlinear transformation convolution layer, and a deep output convolution layer; and the processor is configured to:

increase a dimension of the (i−1)-level feature of the detection image using the deep input convolution layer, to obtain an i-level dimension feature of the detection image;

extract an i-level first convolved feature from the i-level dimension feature of the detection image using the first deep nonlinear transformation convolution layer;

extract an i-level second convolved feature from the i-level first convolved feature using the second deep nonlinear transformation convolution layer; and decrease a dimension of the i-level second convolved feature using the deep output convolution layer, to obtain the i-level feature of the detection image.

14. The apparatus of claim 13, wherein a convolution kernel size of the deep input convolution layer is 1*1, a convolution kernel size of the first deep nonlinear transformation convolution layer is 3*3, a convolution kernel size of the second deep nonlinear transformation convolution layer is 3*3, and a convolution kernel size of the deep output convolution layer is 1*1; and the deep input convolution layer is a standard convolution layer with a nonlinear activation function, the first deep nonlinear transformation convolution layer is a depthwise separable convolution layer with a nonlinear activation function, the second deep nonlinear transformation convolution layer is a depthwise separable convolution layer with a nonlinear activation function, and the deep output convolution layer is a standard convolution layer without an activation function.

15. The apparatus of claim 14, wherein the second deep nonlinear transformation convolution layer is a depthwise separable atrous convolution layer with a nonlinear activation function.

16. The apparatus of claim 12, wherein the non-deep feature extraction model comprises a non-deep input convolution layer, a non-deep nonlinear transformation convolution layer, and a non-deep output convolution layer; and
the processor is configured to:
increase a dimension of the (j−1+n)-level feature of the detection image using the non-deep input convolution layer, to obtain a (j+n)-level dimension feature of the detection image;
extract a (j+n)-level convolved feature from the (j+n)-level dimension feature of the detection image using the non-deep nonlinear transformation convolution layer; and
decrease a dimension of the (j+n)-level convolved feature using the non-deep output convolution layer, to obtain the (j+n)-level feature of the detection image.

17. The apparatus of claim 16, wherein a convolution kernel size of the non-deep input convolution layer is 1*1, a convolution kernel size of the non-deep nonlinear transformation convolution layer is 3*3, and a convolution kernel size of the non-deep output convolution layer is 1*1; and
the non-deep input convolution layer is a standard convolution layer with a nonlinear activation function, the non-deep nonlinear transformation convolution layer is a depthwise separable convolution layer with a nonlinear activation function, and the non-deep output convolution layer is a standard convolution layer without an activation function.

18. The apparatus of claim 12, wherein the feature prediction model comprises a feature classification convolution layer and a feature output convolution layer; and
the processor is configured to:
extract a classification recognition feature from the a-level feature to the (m+n)-level feature of the detection image using the feature classification convolution layer; and
decrease a dimension of the classification recognition feature using the feature output convolution layer, to obtain the object type information and the object position information of the object in the detection image.

19. The apparatus of claim 18, wherein a convolution kernel size of the feature classification convolution layer is 3*3, and a convolution kernel size of the feature output convolution layer is 1*1; and
the feature classification convolution layer is a depthwise separable convolution layer without an activation function, and the feature output convolution layer is a standard convolution layer without an activation function.

20. A non-transitory machine-readable media, having processor executable instructions stored thereon for causing a processor to:
obtain a detection image, an n-level deep feature map framework, and an m-level non-deep feature map framework, n being an integer greater than or equal to 2, m being an integer greater than or equal to 1, and the n-level deep feature map framework and the m-level non-deep feature map framework comprising a feature size and a feature dimension;
extract, based on a deep feature extraction model, deep feature from an (i−1)-level feature of the detection image using an i-level deep feature map framework, to obtain an i-level feature of the detection image, i being a positive integer less than or equal to n;
extract, based on a non-deep feature extraction model, non-deep feature from a (j−1+n)-level feature of the detection image using a j-level non-deep feature map framework, to obtain a (j+n)-level feature of the detection image, j being a positive integer less than or equal to m; and
perform, based on a feature prediction model, an information regression operation on an a-level feature to an (m+n)-level feature of the detection image, to obtain an object type information and an object position information of an object in the detection image, a being an integer less than n and greater than or equal to 2.

* * * * *